(12) United States Patent
Farchione et al.

(10) Patent No.: US 11,415,449 B2
(45) Date of Patent: Aug. 16, 2022

(54) CYLINDER ATTACHMENT

(71) Applicant: WORTHINGTON CYLINDERS CORPORATION, Columbus, OH (US)

(72) Inventors: Louis Farchione, Columbus, OH (US); Joel Vangilder, Columbus, OH (US); Brian Poland, Columbus, OH (US)

(73) Assignee: WORTHINGTON CYLINDERS CORPORATION, Columbus, OH (US)

( * ) Notice: Subject to any disclaimer, the term of this patent is extended or adjusted under 35 U.S.C. 154(b) by 0 days.

(21) Appl. No.: 17/217,079

(22) Filed: Mar. 30, 2021

(65) Prior Publication Data
US 2021/0325230 A1    Oct. 21, 2021

Related U.S. Application Data

(60) Provisional application No. 63/010,329, filed on Apr. 15, 2020.

(51) Int. Cl.
*G01F 23/20* (2006.01)

(52) U.S. Cl.
CPC ..................... *G01F 23/20* (2013.01)

(58) Field of Classification Search
CPC ........................................ G01F 23/20
See application file for complete search history.

(56) References Cited

U.S. PATENT DOCUMENTS

| | | | | |
|---|---|---|---|---|
| 4,413,515 A | * | 11/1983 | Quinn | G01F 23/20 126/41 R |
| 4,712,713 A | * | 12/1987 | Karlis | B01F 23/2361 222/467 |
| D301,554 S | | 6/1989 | Ogawa | |
| 6,410,864 B1 | * | 6/2002 | Kim | G01G 19/14 73/296 |
| D568,183 S | | 5/2008 | Ishii | |
| D592,085 S | | 5/2009 | Ohtani | |
| D672,668 S | | 12/2012 | Gibb | |

(Continued)

FOREIGN PATENT DOCUMENTS

| | | | | |
|---|---|---|---|---|
| EP | 2599732 A1 | * | 6/2013 | ........... B65D 51/248 |
| FR | 3106188 A1 | * | 7/2021 | .............. F17C 13/08 |

OTHER PUBLICATIONS

Bernzomatic Fuel Gauge, Jan. 28, 2021, Amazon.com Jun. 3, 2021. URL: https://www.amazon.com/dp/B08VCNY9CG?tag=price15723-2-&ascsubtag-wtbs_60b982d84130a5d1d3fe8c4 (Year: 2021).

(Continued)

*Primary Examiner* — John Fitzgerald
(74) *Attorney, Agent, or Firm* — Tucker Ellis, LLP

(57) ABSTRACT

Provided is a gauge configured to be connected to a pressurized tank. The gauge includes a casing defining an internal cavity, a measuring device disposed in the internal cavity, a power source disposed in the internal cavity, a display at a front surface of the casing powered by the power source, and an attachment member coupled to the measuring device and casing, the attachment member including a body and first and second legs projecting downward from the body, each of the first and second legs having a radially inwardly extending foot for supporting a neck of the pressurized tank, wherein fronts of the legs are circumferentially spaced from one another a greater distance than backs of the legs.

20 Claims, 33 Drawing Sheets

(56) References Cited

U.S. PATENT DOCUMENTS

| | | |
|---|---|---|
| D705,101 S | 5/2014 | Haener |
| D716,168 S | 10/2014 | Au Yeung |
| D718,157 S | 11/2014 | Naughton |
| 9,140,596 B2 * | 9/2015 | Wang .................... G08B 21/182 |
| D747,438 S | 1/2016 | Sanchez |
| D760,097 S | 6/2016 | Benoit |
| D795,719 S | 8/2017 | Lean |
| D809,090 S | 1/2018 | Aguiar |
| D828,196 S | 9/2018 | Tschudin |
| D838,614 S | 1/2019 | Tschudin |
| D838,615 S | 1/2019 | Tschudin |
| D838,616 S | 1/2019 | Tschudin |
| D845,435 S | 4/2019 | Pedrosa |
| D852,649 S | 7/2019 | Burns |
| 10,618,794 B2 * | 4/2020 | Raguzin ............... B67D 1/0075 |
| D885,219 S | 5/2020 | Kurani |
| D885,221 S | 5/2020 | Huang |
| D905,581 S | 12/2020 | Wada |
| 11,022,482 B2 * | 6/2021 | Parker .................... G01G 23/00 |
| 11,047,714 B2 * | 6/2021 | Boulay .................... G01F 23/28 |
| 2007/0257498 A1 * | 11/2007 | Swain .................... F17C 13/002 |
| | | 294/166 |
| 2013/0277376 A1 | 10/2013 | Iiebenberg |
| 2016/0331894 A1 * | 11/2016 | Harmon ............... G08B 21/182 |
| 2019/0202680 A1 * | 7/2019 | Rider .................... B67D 1/0802 |
| 2021/0217287 A1 * | 7/2021 | Andre Dias ....... G08B 21/0461 |
| 2021/0262837 A1 * | 8/2021 | Boulay ................ G01D 11/245 |

OTHER PUBLICATIONS

Samsonite Manual Luggage Scale, Black Apr. 12, 2017, Amazon.com, Jun. 7, 2021; https://www.amazon.com/Samsonite-77778-1041-Manual-Scale-Black (2017).

Wisefield Digital Hanging fish Scale, Aug. 1, 2016, Amazon.com, Jun. 7, 2021; htt's://www.amazon.com/WiseField-Digital-Hanging-Luggage-Backlit (2016).

LurEra Fish Weighing Scale Portable Digital, Apr. 13, 2019, Amazon.com, Jun. 7, 2021; https://www.amazon.com/dp/B093XNG85G (2019).

* cited by examiner

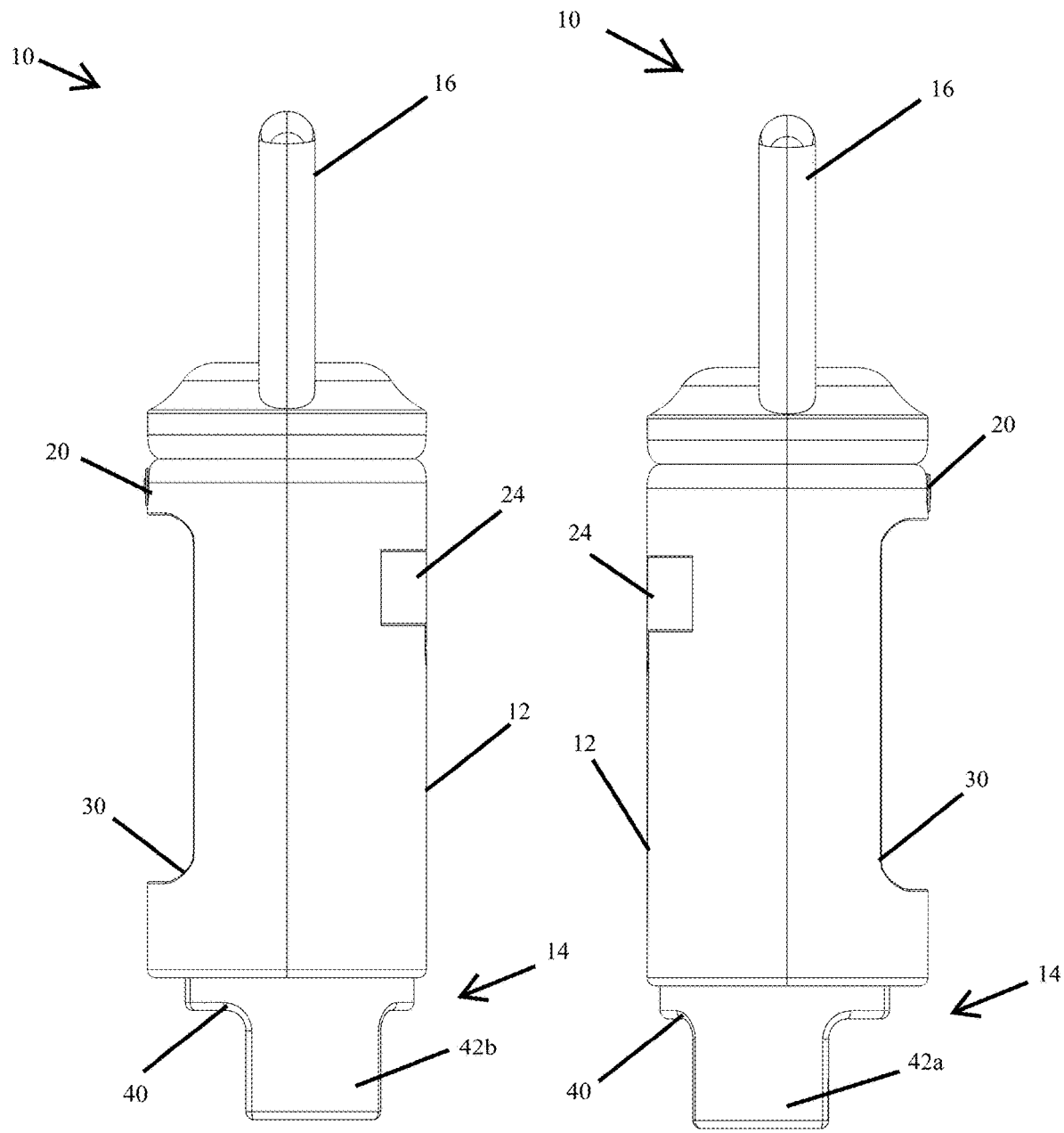

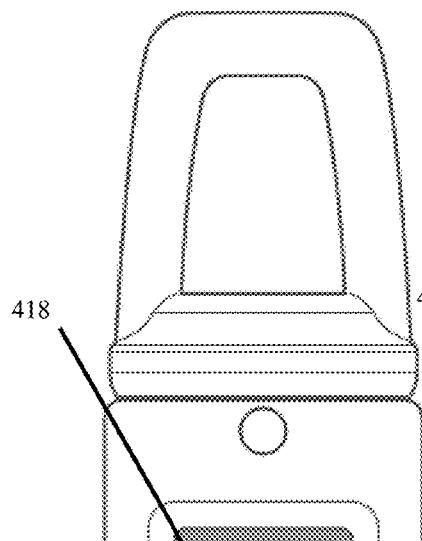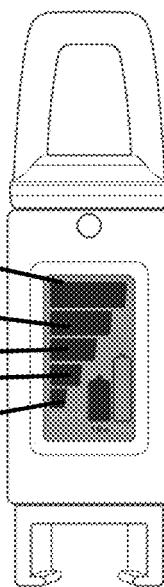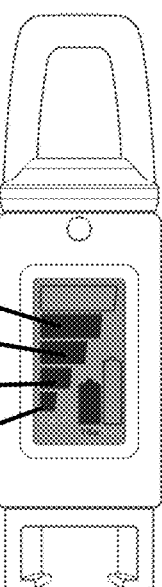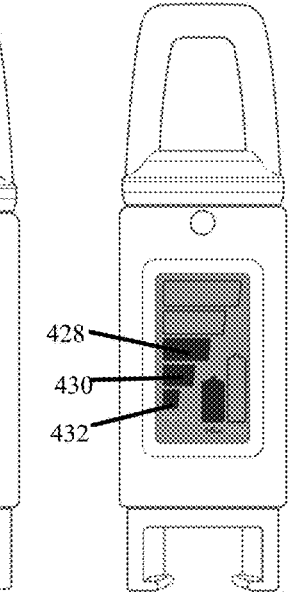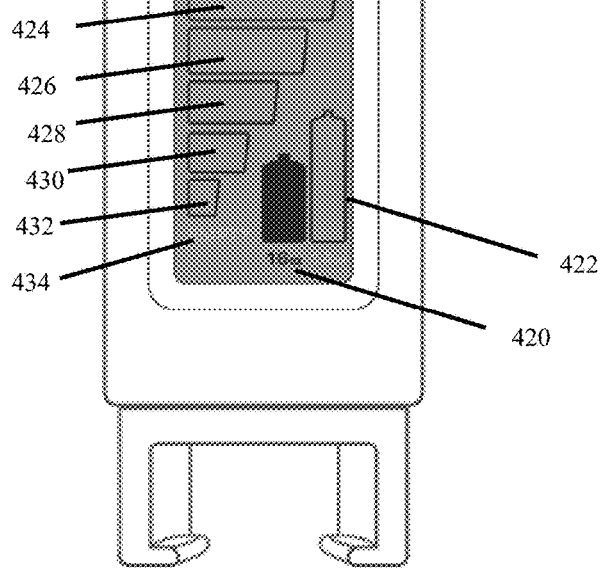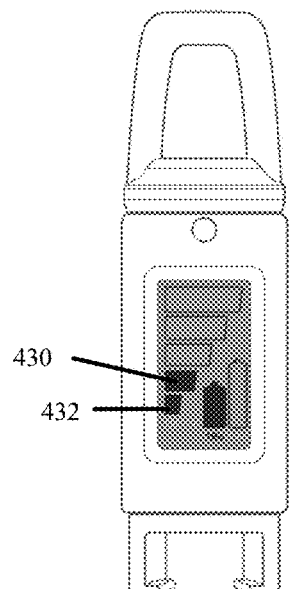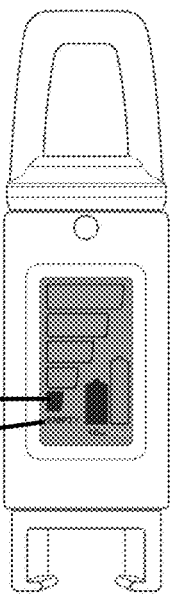
FIG. 20  FIG. 20a  FIG. 20b  FIG. 20c  FIG. 20d  FIG. 20e

CYLINDER ATTACHMENT

RELATED APPLICATIONS

This application claims the benefit of U.S. Provisional No. 63/010,329 filed Apr. 15, 2020, which is hereby incorporated herein by reference.

TECHNICAL FIELD

This application relates generally to devices used to connect to a valve of a pressurized tank, and more particularly, devices used to connect a gauge to a valve of a pressurized tank.

BACKGROUND OF THE INVENTION

Pressurized tanks are commonly used for storing fluids, where the tank can keep the fluid close to, or in a steady state, while limiting the oxygen in the environment. A fluid is in a steady state when the properties of the fluid are unchanging overtime. These properties may include pressure and temperature. Certain fluids have lower stabilities, and require specific storing conditions, usually at steady state. This instability may include oxidization and/or combustion under certain conditions. These conditions may include exposure to atmospheric air, high temperatures, and/or high pressures.

Storing certain fluids in pressurized tanks may aid in preserving the integrity of the fluid, by decreasing the chance of unwanted chemical reactions. These pressurized tanks are routinely opaque, making it difficult to determine the amount of fluid remains in the tank. Gauges can be provided that indicate fluid levels.

SUMMARY OF THE INVENTION

In accordance with an embodiment of the present invention, a gauge configured to be connected to a pressurized tank is provided. The gauge includes a casing defining an internal cavity, a measuring device disposed in the internal cavity, a power source disposed in the internal cavity, a display at a front surface of the casing powered by the power source, and an attachment member coupled to the measuring device and casing, the attachment member including a body and first and second legs projecting downward from the body, each of the first and second legs having a radially inwardly extending foot for supporting a neck of the pressurized tank, wherein fronts of the legs are circumferentially spaced from one another a greater distance than backs of the legs.

In accordance with another embodiment of the present invention, an attachment member is provided that includes a body, and first and second deflectable legs extending downward from the body on opposed sides thereof, each of the first and second legs having a radially inwardly extending foot at a free end thereof forming a ledge below threads of a neck of a pressurized tank, wherein fronts of the legs are circumferentially spaced from one another a greater distance than backs of the legs to allow the neck to be inserted between the fronts of the legs and prevent the neck from passing through a space between the backs of the legs.

In accordance with still another embodiment of the present invention, a gauge configured to be connected to a pressurized tank is provided. The gauge includes a casing defining an internal cavity, a measuring device disposed in the internal cavity for measuring a weight of the pressurized tank, a display coupled to the casing and configured to display indicia indicating a level of fluid in the pressurized tank based on the weight, a control element for activating the display and toggling between a first pressurized tank size and a second pressurized tank size, and an attachment member coupled to the measuring device and the casing, the attachment member including a body and first and second legs projecting downward from the body, each of the first and second legs having a radially inwardly extending foot for supporting a neck of the pressurized tank free of a threaded connection to the neck.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 4 is a left side view of the gauge.
FIG. 5 is a right side view of the gauge.
FIG. 20 is a front view of another exemplary gauge.
FIGS. 20a-20e show various states of display of the gauge shown in FIG. 20.

DETAILED DESCRIPTION OF THE INVENTION

Figure 1:
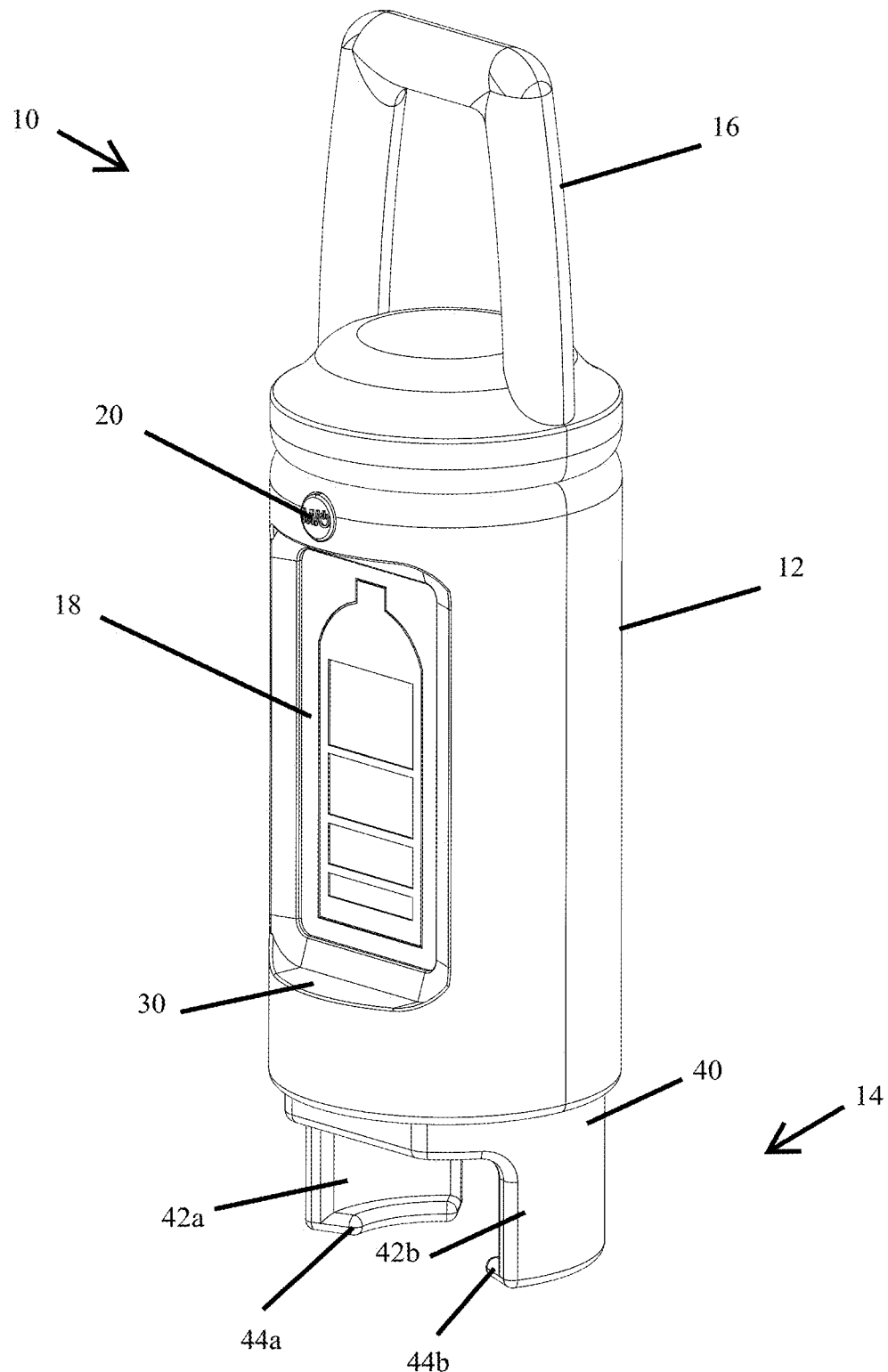
FIG. 1 is a perspective view of an exemplary gauge.
Figure 2:
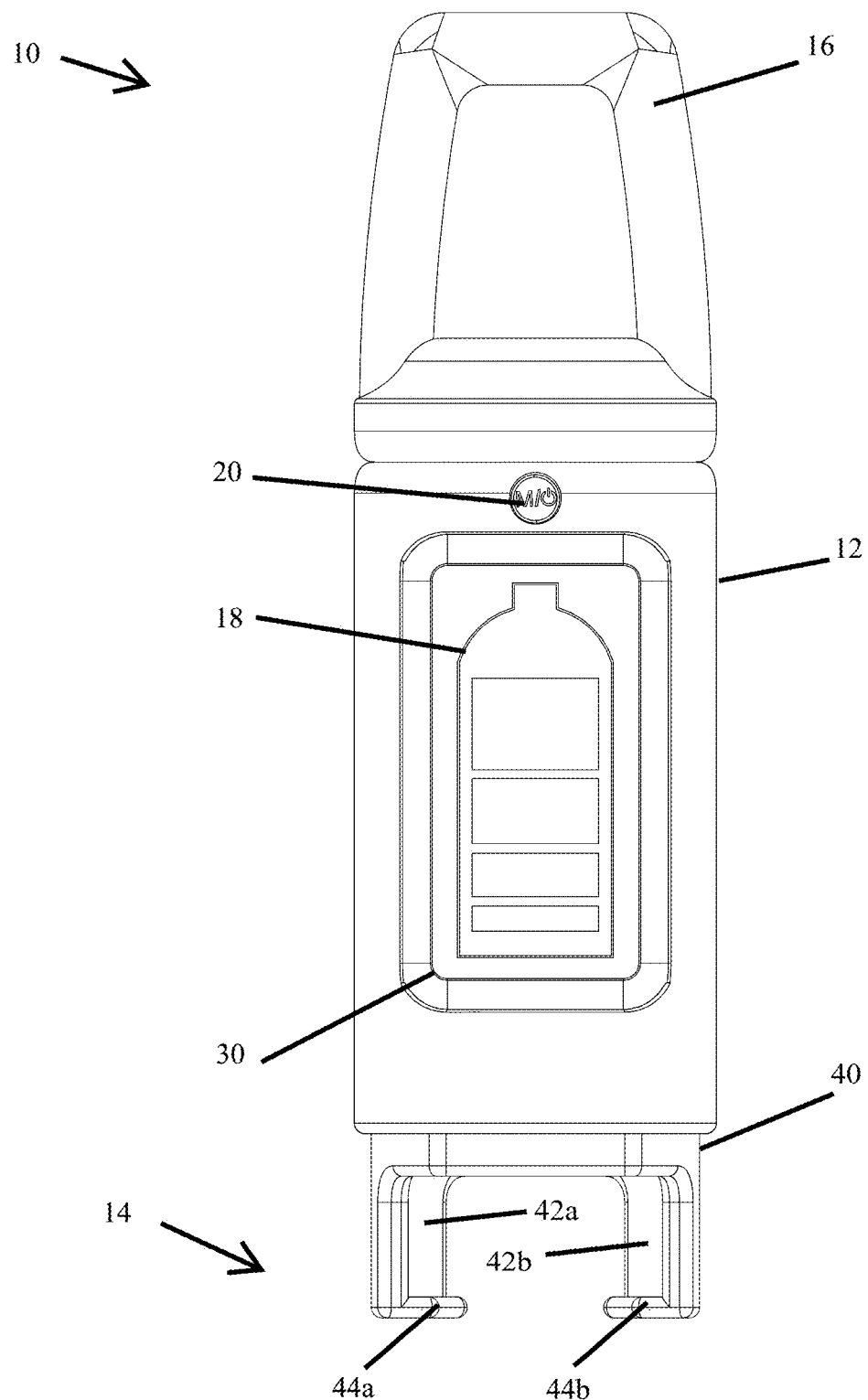
FIG. 2 is a front view of the gauge.
Figure 3:
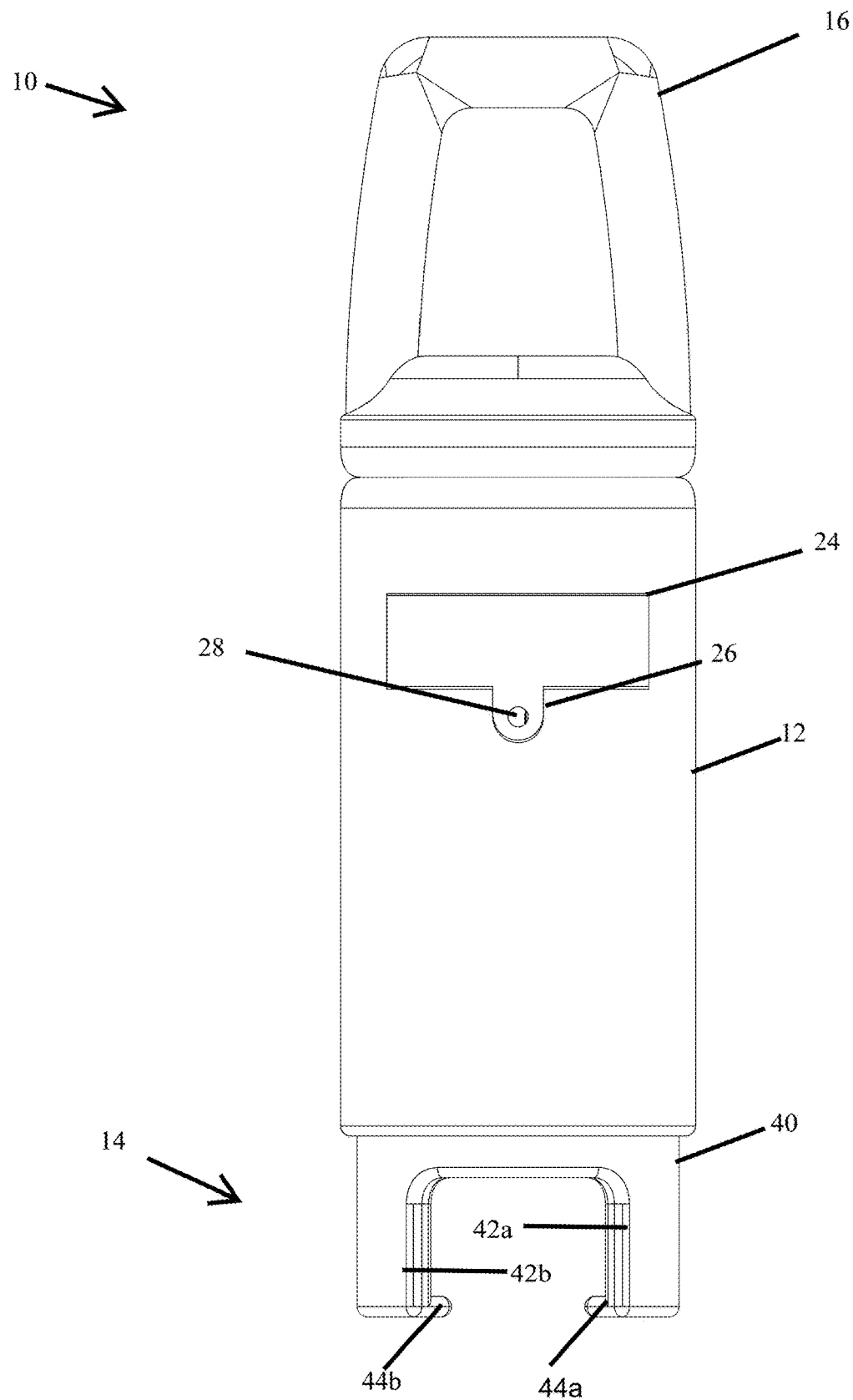
FIG. 3 is a back view of the gauge.
Figure 6:
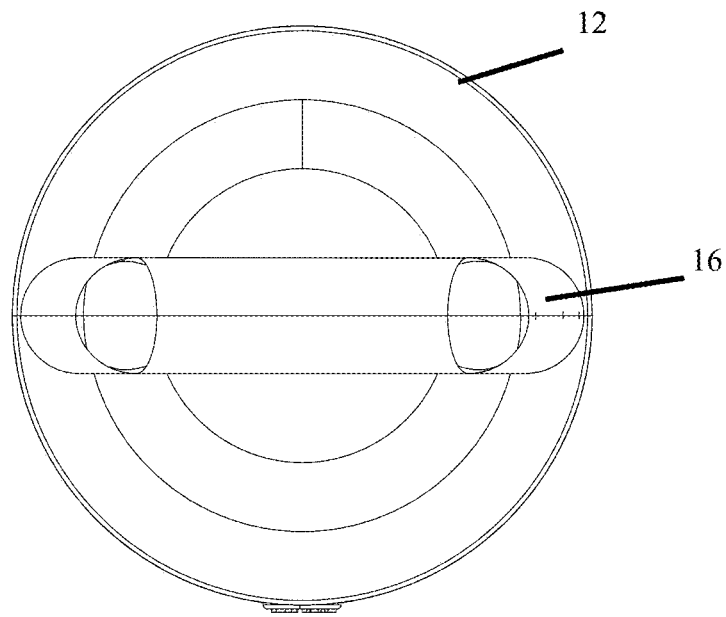
FIG. 6 is a top view of the gauge.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIGS. 1-7, a gauge for attachment to a container is shown generally at reference numeral 10. The gauge 10 includes a casing 12, an attachment member 14 coupled to a bottom of the casing 12, and a handle 16 coupled to a top of the casing 12. For example, the handle 16 has a first end and a second end coupled to the top surface of the casing 12 to allow for ease of handling, carrying, and storage of the gauge 10. The casing 12, the attachment member 14, and the handle 16 may be made of any suitable material, such as plastic, metal, etc. The casing 12 has a front surface where a display 18, such as a digital display, and a control element 20, such as a button, are located. The display 18 can display a depiction of a tank as shown with indicators of the level of fluid in a tank, and receive an electrical signal to indicate the level of fluid within the tank. The display may indicate the level of fluid by numbers, symbols, or other suitable indicia, as will be described in detail below.

The term container as used herein can be defined as any cylinder, tank, housing, canister, and the like of any suitable material that can house or contain at least one of alternative fuels, renewable fuel sources, nonrenewable fuel sources, liquid fuel sources, or gas fuel sources. It is to be appreciated that the container can house a portion of a material, wherein the material can be a solid, a gas, a liquid, a plasma, among others. Renewable fuel sources can include biofuels such as vegetable oil, ethanol, methanol, butanol, other bioalcohols, biomass, or biodiesel, among others. Renewable fuel sources can also include hydrogen and/or hydrogen fuel cells, refuse-derived fuel, chemically stored fuel, non-fossil methane, non-fossil natural gas, Ammonia, Formic acid, liquid Nitrogen, compressed air, or propane derived from renewable methods, among others. Nonrenewable fuel source can include gasoline, propane, or diesel, among others. It be appreciated that the container 102 can house a material chosen with sound engineering judgment without departing from the intended scope of coverage of the embodiments of the subject invention.

Figure 8:
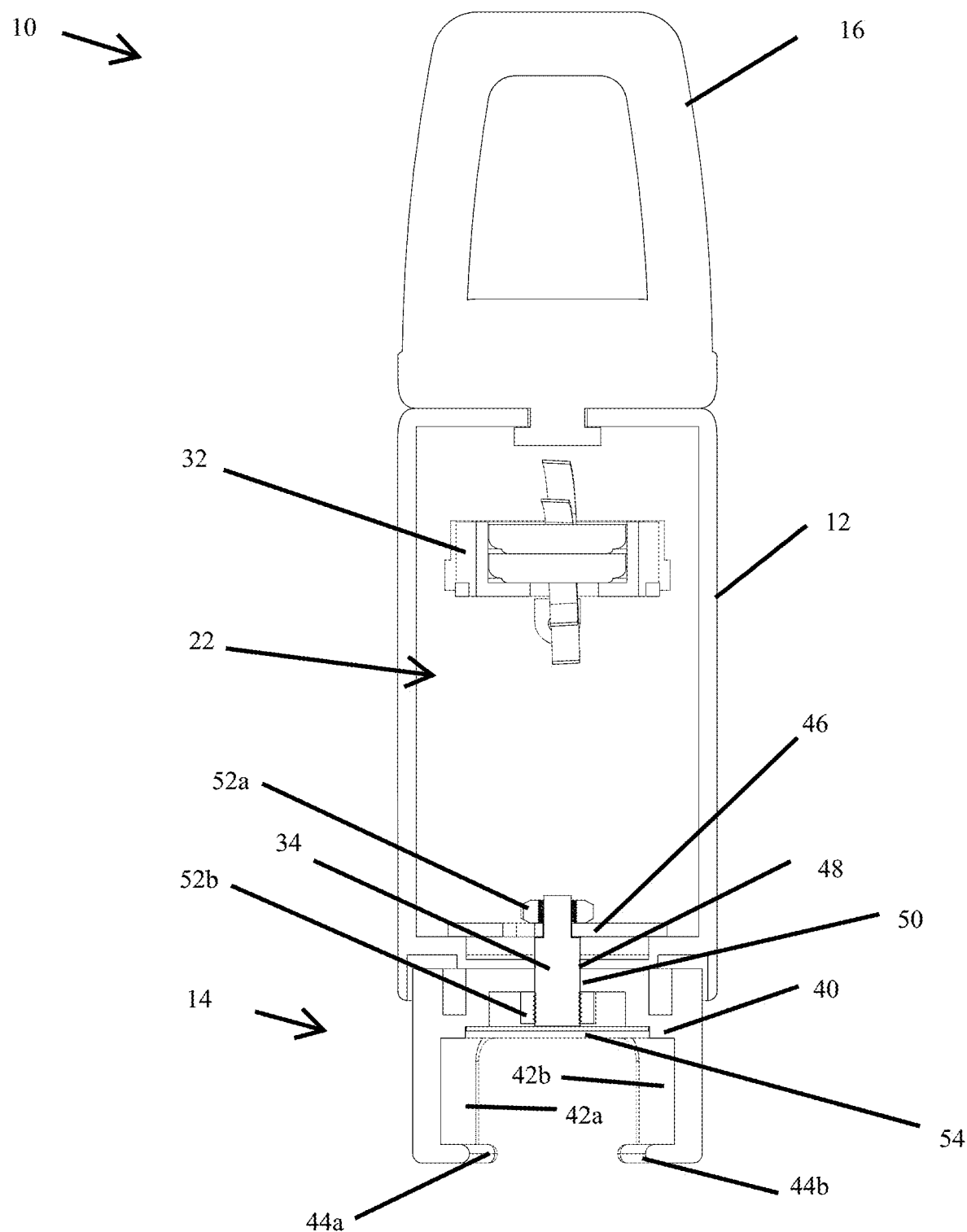
FIG. 8 is a cross-sectional view of the gauge

Referring additionally to FIG. 8, the casing 12 has a top surface, a bottom surface, a back surface, and a front surface, and the casing 12 has an interior cavity 22 that houses internal components. The casing 12 is substantially cylindrical in shape, although the casing 12 may have other suitable shapes and/or more or less than four surfaces, such as a rectangular shape, octagonal shape, etc. In the illustrated embodiment, the top surface and bottom surface of the casing 12 are circular and substantially flat to allow for attachment of the handle 16 and attachment member 14 respectively.

The back surface of the casing 12 has a cover 24 that is removable for accessing the internal cavity 22 of the casing 12. The cover 24 may have a suitable shape, such as a rectangular shape with a projection 26 having an opening 28 for receiving a suitable fastener, such as a screw, to secure the cover 24. The cover 24 can be removed to allow for access to a power source 32 to change the power source as needed. In another embodiment, a longer-term power source may be provided and the casing 12 provided without a cover 24.

The front surface of the casing has a recessed area 30 where the display 18 is located. The recessed area 30 allows the display 18 to be flat when utilized with a front surface having a curved shape. The recessed area 30 also offers protection of the display 18 against drops or other contact against the front surface. The front surface may also have different arrangements with the display 18. For example, the front surface may be flush with the display 18 or the display 18 may be located on a protrusion from the front surface.

Figure 9:
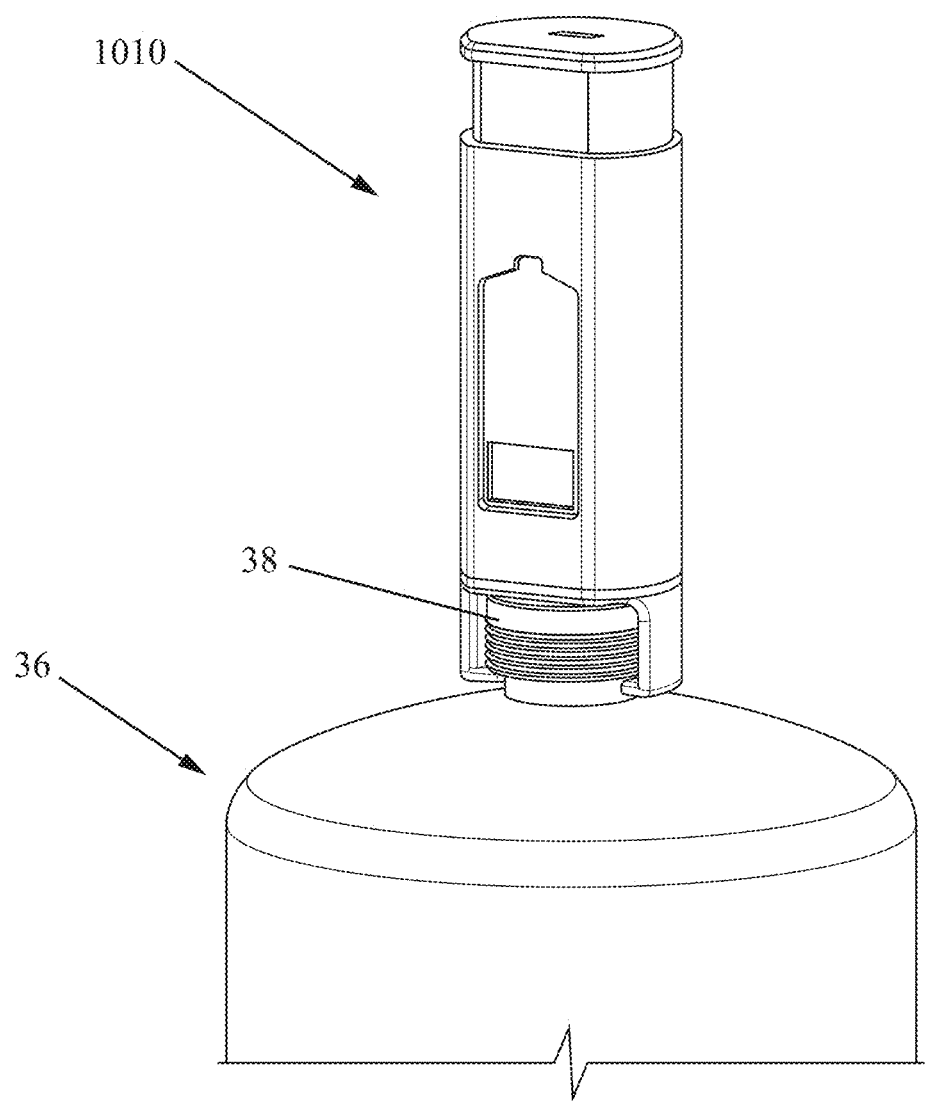
FIG. 9 is a perspective view of an exemplary gauge attached to a pressurized tank.
Figure 10:
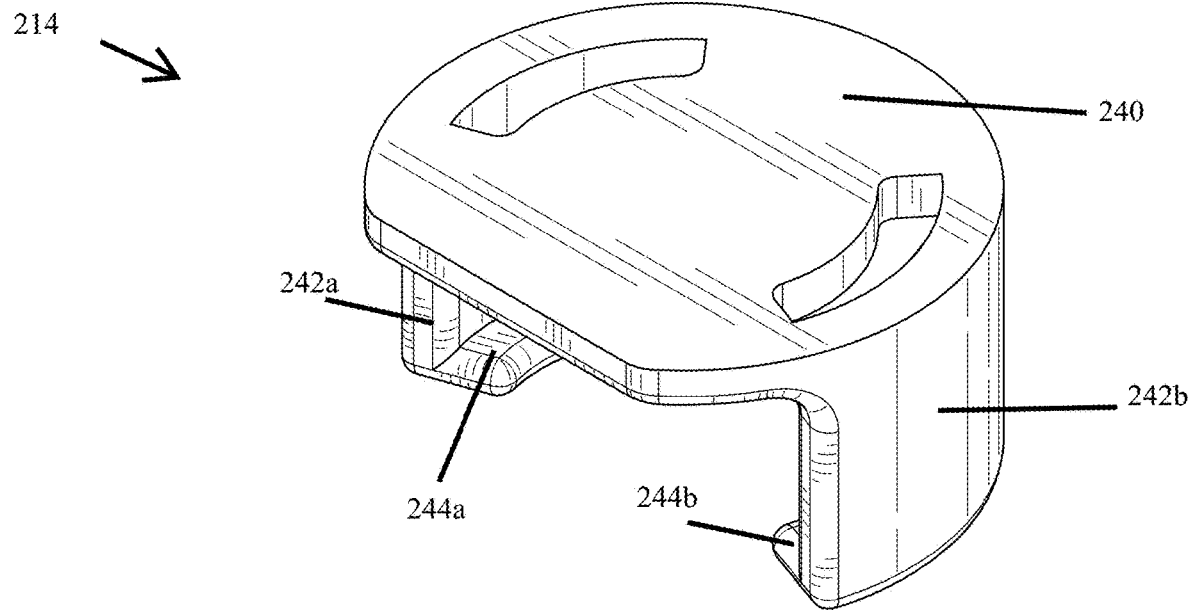
FIG. 10 is a perspective view of an exemplary attachment member.
Figure 11:
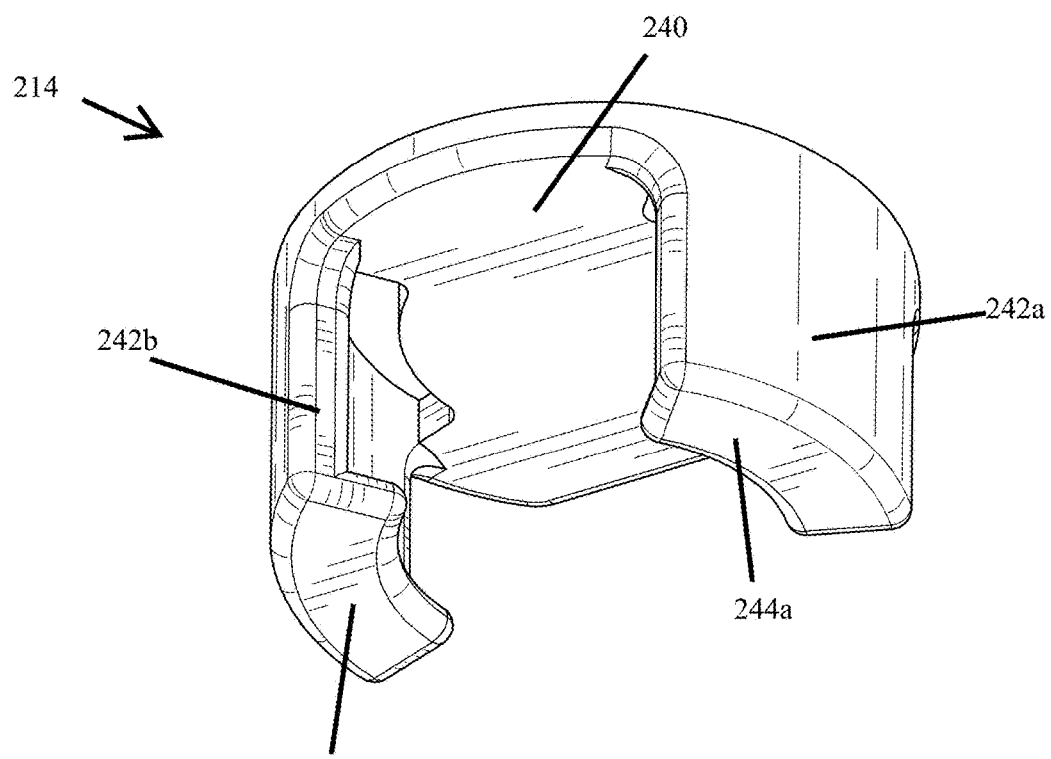
FIG. 11 is another perspective view of the attachment member.
Figure 12:
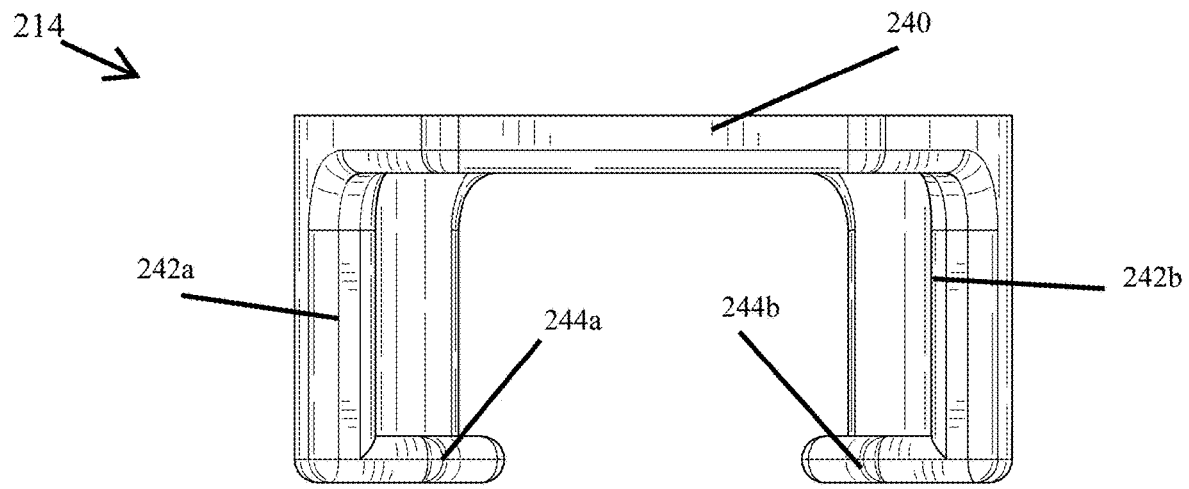
FIG. 12 is a front view of the attachment member.
Figure 13:
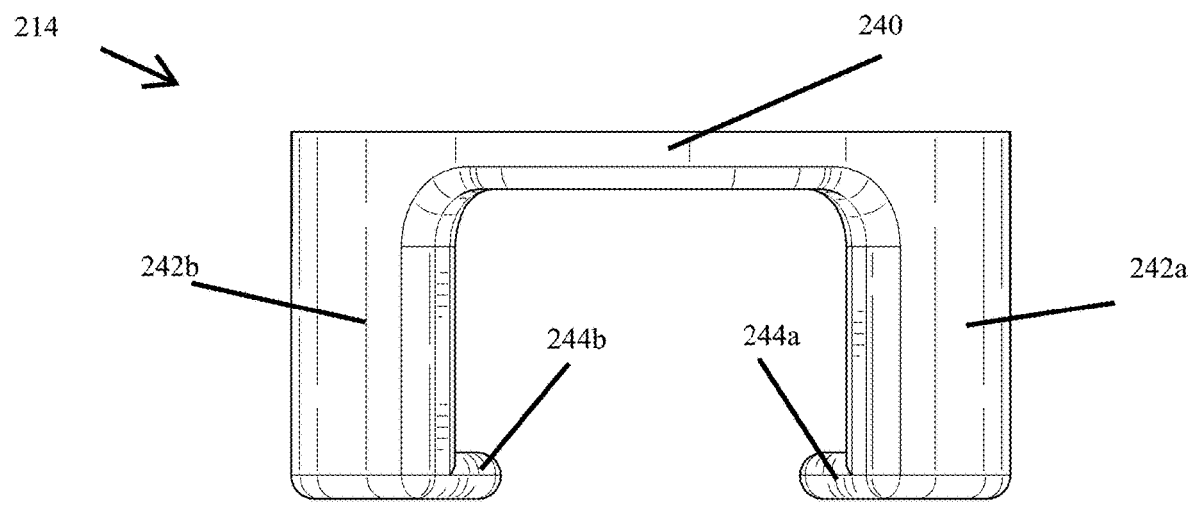
FIG. 13 is a back view of the attachment member.
Figure 14:
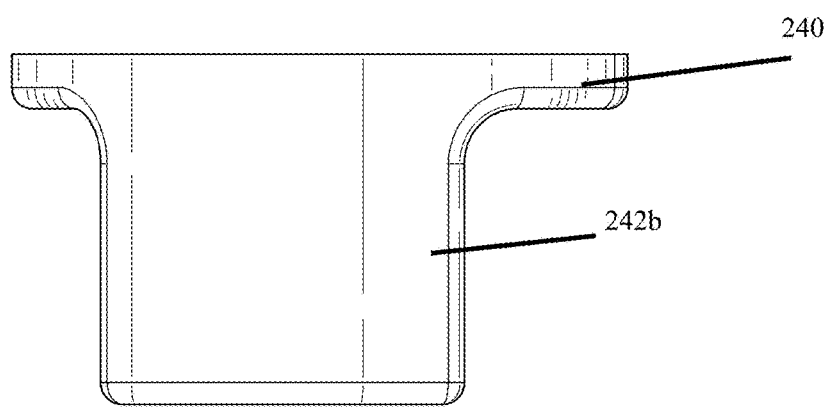
FIG. 14 is a right side view of the attachment member.
Figure 15:
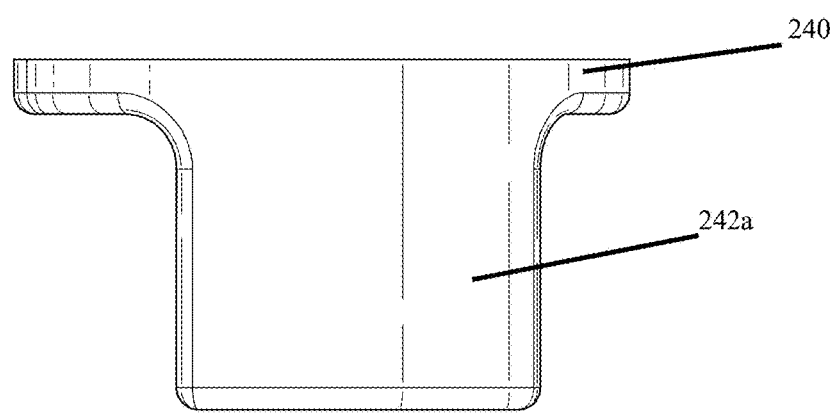
FIG. 15 is a left side view of the attachment member.
Figure 16:
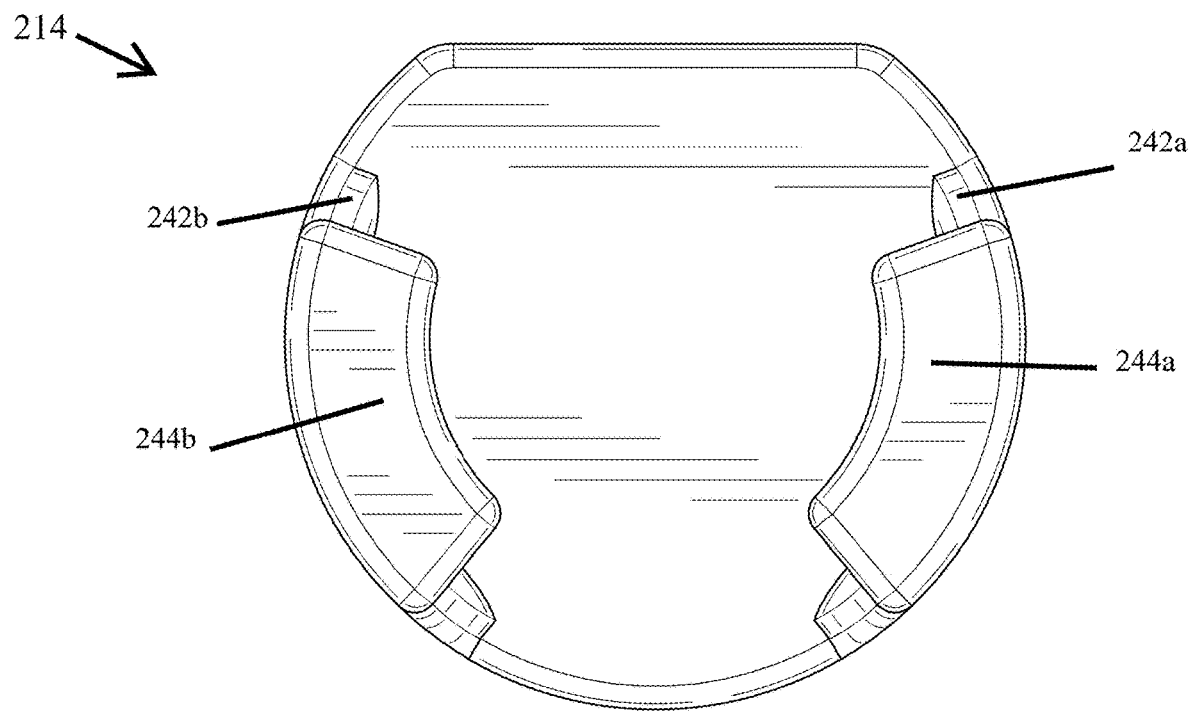
FIG. 16 is a bottom view of the attachment member.
Figure 17:
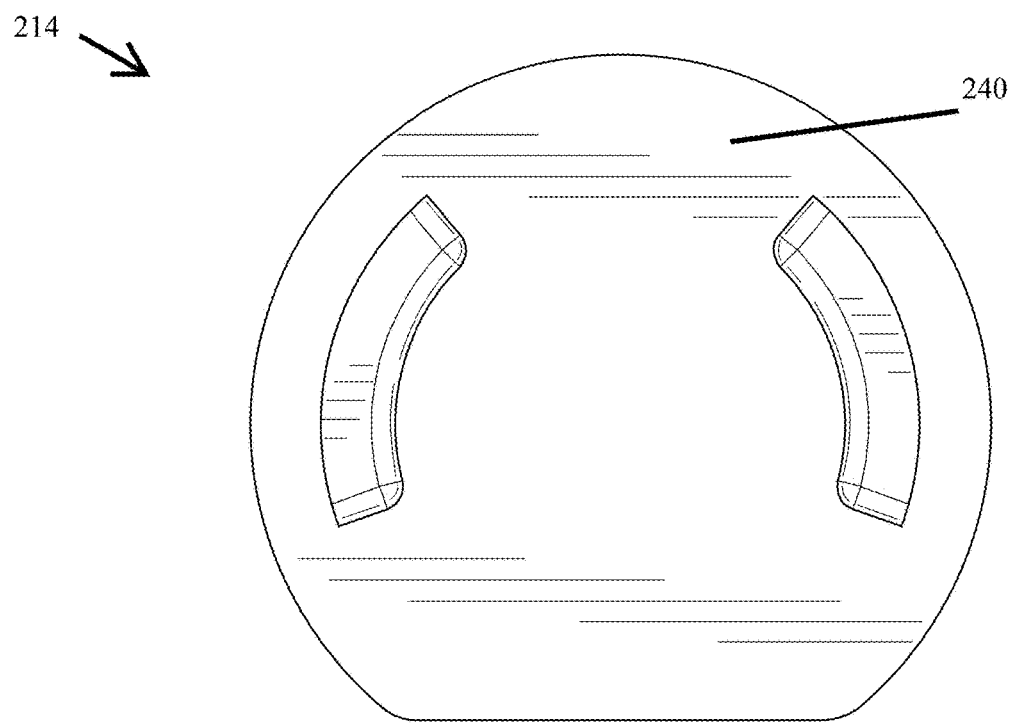
FIG. 17 is a top view of the attachment member.

The front surface of the casing also has the control element 20 near the top surface for turning on the device and toggling between control modes, for example by selecting the volume of a pressurized cylinder or tank 36 (FIG. 9) to be measured. The control element 20 may be a push bottom, switch, or the like and have any suitable shape, such as circular, square, oval, etc. The control element 20 may alternatively be integrated into the display 18 or other suitable location, and the control element 20 may be flush with the front surface, protruding from the front surface, or recessed relative to the front surface. When the control element 20 is activated or turned on and a cylinder attached to the attachment member 14, a measuring device 46 converts force from the cylinder to an electrical signal and transmits the signal to the display 18. When the control element 20 is deactivated or turned off, the measuring device 46 and the display 18 can be deactivated.

As noted above, the casing 12 serves to house internal components, such as the power source 32 and the measuring device 46. The power source 32 can be any suitable power source that provides power to the measuring device 46 and the display 18. For example, the power source 32 may be a battery or a set of batteries. In the illustrated embodiment, two batteries are provided near the top of the casing 12 proximate the control element 20 and positioned between contacts, although it will be appreciated that the position of the batteries can be varied.

The measuring device 46 measures certain properties, such as weight of the pressurized cylinder and thereby a fluid level within the pressurized cylinder 36 with a pre-known volume. The measuring device can be connected to the power source 32 and the display 18, for example by suitable wires. The measuring device 46 may be calibrated to measure the weight and thus fluid volume in a fourteen ounce tank and/or a sixteen ounce tank. In one embodiment, the fluid level is measured by converting force exerted by the pressurized cylinder to electrical signals. The amount of force exerted on the measuring device 46 is indicative of the level of fluid within a pressurized tank. The measuring device 46 may be a suitable device, such as a load cell, where the load cell is placed on the bottom surface of the casing 12 and coupled to the attachment member 14 to convert the force exerted by the tank into an electrical signal. Applying a constant force to the measuring device 46 may increase the accuracy of the electrical signal indicating the level of fluid in the pressurized tank 36. This constant force can be achieved by coupling the casing 12 to the attachment member 14, and affixing the attachment member 14 and casing 12 to a pressurized tank 36.

The casing 12 may be coupled to the attachment member 14 in a suitable manner, for example, a fastener 34 may be inserted through an opening 48 in the bottom of the casing 12 and through an opening 50 in the attachment member 14, and suitable nuts 52*a* and 52*b* may be attached to the ends of the fasteners respectively. A cover plate 54 may be attached to the attachment member 14, for example by an adhesive, to cover the nut 52*b*. It will be appreciated that the attachment member 14 may be attached to other suitable devices, such as a storage rack having the necessary components to allow for measuring of the contents of the tank or be a standalone component used for storing tanks. It will also be appreciated that the measuring device 46 can communicate wirelessly with a wireless communication device to deliver the results and/or be programmed.

Referring now to the attachment member 14 detail, the attachment member 14 is shaped and sized to be removably attached to a valve neck 38 of the pressurized tank 36, such as to a CGA600 valve neck, without a threaded connection to the valve neck. The attachment member 14 is capable of attaching to and detaching from the valve 38 by applying a set amount of force. This force may allow the attachment member 14 to disconnect from the valve 38, for example if the gauge 10 and tank 36 were dropped while connected to one another. The attachment member 14 has a body 40 and a pair of deflectable legs 42*a* and 42*b* extending downward from the body 40 on opposing sides of the body 40. In the illustrated embodiment, the legs are integrally formed with the body. Each leg 42*a* and 42*b* has a first end extending from the body 40, and a second end with a respective foot 44*a*, 44*b* extending radially inwardly therefrom for holding the neck of the tank. An inner surface of each leg 42*a* and 42*b* wraps around and serves as a backstop to center the cylinder 36. The feet 44*a* and 44*b* of each leg 42*a* and 42*b* rest beneath the threading of the valve 38 to hold and lift the cylinder and prevent the attachment member 14 from being lifted off of the valve 38. In the illustrated embodiment, the body is shown as being substantially circular with a flat at the front, and the legs 42*a* and 42*b* are curved to correspond to the curve of the body.

Figure 7:
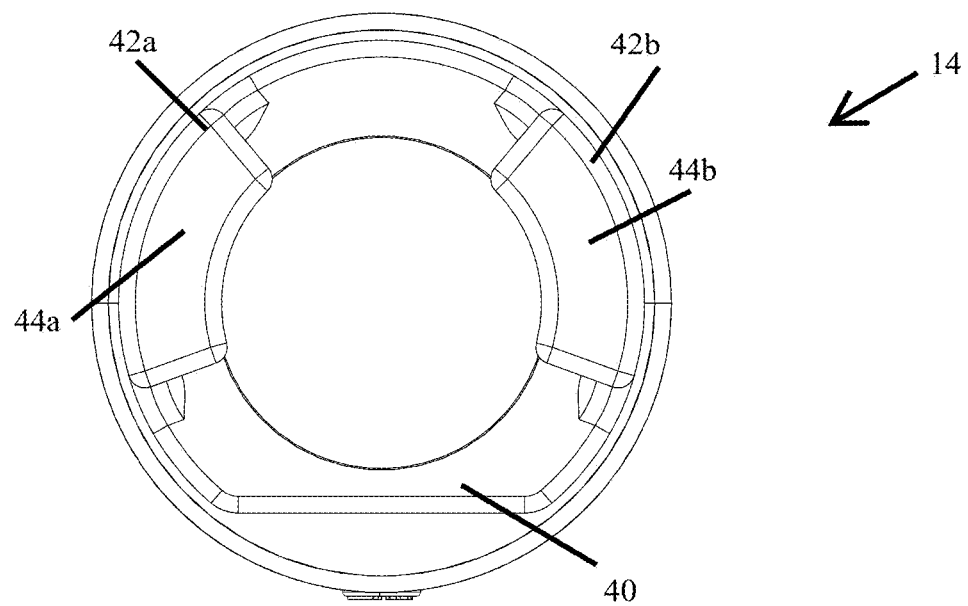
FIG. 7 is a bottom view of the gauge.

As best shown in FIG. 7, the fronts of the legs 44*a* and 44*b* are circumferentially spaced from one another a greater distance than the backs of the legs 44*a* and 44*b* are circumferentially spaced from one another to allow the neck to be inserted between the front of the legs and prevent the neck from passing through the space between the back of the legs. For example, the front of the legs are angled an angle X from a center of the body, for example twenty degrees from the center of the body 40 allowing for the neck to be inserted between the legs, and the back of the legs are angled at a greater angle such that they are closer to one another to prevent the neck from passing through the space between the back of the legs. As the neck is being inserted between the legs 44*a* and 44*b*, the neck deflects the legs 44*a* and 44*b* outward and is held between the legs 44*a* and 44*b* by a snap fit. When attached, the fronts of the legs are in front of a center of the neck. The tank can then be moved in the opposite direction to detach the neck from the attachment member 14.

Once valve 38 of the pressurized tank 36 is secured to the attachment member 14, the control element 20 can be activated to toggle between volumes of pressurized tanks 36 until a volume is selected matching the pressurized tank 36 to be measured, for example depending on whether a fourteen ounce or sixteen ounce tank is being measured, and the measuring device 46 measures the internal properties of the pressurized tank 36. The display 18 then displays the level of fluid remaining inside the pressurized tank 36. It will be appreciated that the control element 20 could also be activated prior to attachment of the pressurized tank 36.

Turning now to FIGS. 10-18, an exemplary embodiment of the attachment member is shown at 214. The attachment member 214 is substantially the same as the above referenced attachment member 14, and consequently the same reference numerals but indexed by 200 are used to denote structures corresponding to similar structures in the attachment members. In addition, the foregoing description of the attachment member 14 is equally applicable to the gauge except as noted below.

The attachment member 214 has a body 240 and a pair of deflectable legs 242*a* and 242*b* extending downward from the body 240 on opposing sides of the body 240. In the illustrated embodiment, the legs are integrally formed with the body. Each leg 242*a* and 242*b* has a first end extending from the body 240, and a second end with a respective foot 244*a*, 244*b* extending radially inwardly therefrom for holding the neck of the tank. An inner surface of each leg 242*a* and 242*b* wraps around and serves as a backstop to center the cylinder. The feet 244*a* and 244*b* of each leg 242*a* and 242*b* rest beneath the threading of the valve to hold and lift the cylinder and prevent the attachment member 214 from being lifted off of the valve. In the illustrated embodiment, the body is shown as being substantially circular with a flat at the front, and the legs 242*a* and 242*b* are curved to correspond to the curve of the body. The body 240 also includes a pair of openings 246*a* and 246*b* provided for molding and can be attached to the casing in a suitable manner, for example as discussed above.

Figure 18:
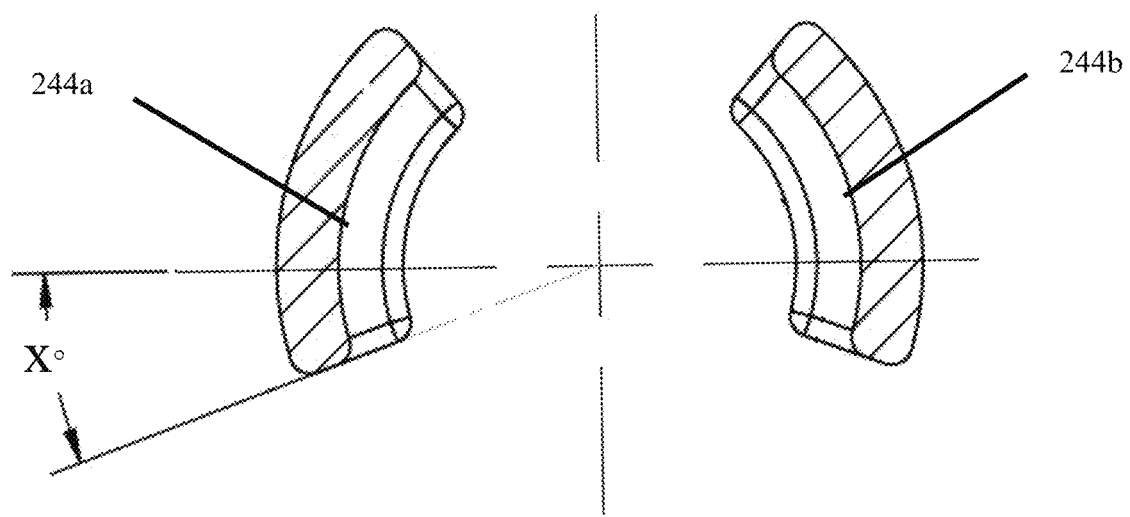
FIG. 18 is a top view of the legs of the attachment member.

The fronts of the legs 244*a* and 244*b* are circumferentially spaced from one another a greater distance than the backs of the legs 244*a* and 244*b* are circumferentially spaced from one another to allow the neck to be inserted between the front of the legs and prevent the neck from passing through the space between the back of the legs. For example, the front of the legs are angled an angle X from a center of the body as shown in FIG. 18, for example twenty degrees from the center of the body 240 allowing for the neck to be inserted between the legs 244*a* and 244*b*, and the back of the legs 244*a* and 244*b* are angled at a greater angle such that they are closer to one another to prevent the neck from passing through the space between the back of the legs 244*a* and 244*b*.

Turning now to FIGS. 19-25, exemplary embodiments of the display are shown at 318-918 that may be incorporated into the gauge 10 as an alternative to the display 18.

Figures 19, 19A, 19B, 19C, 19D, 19E:
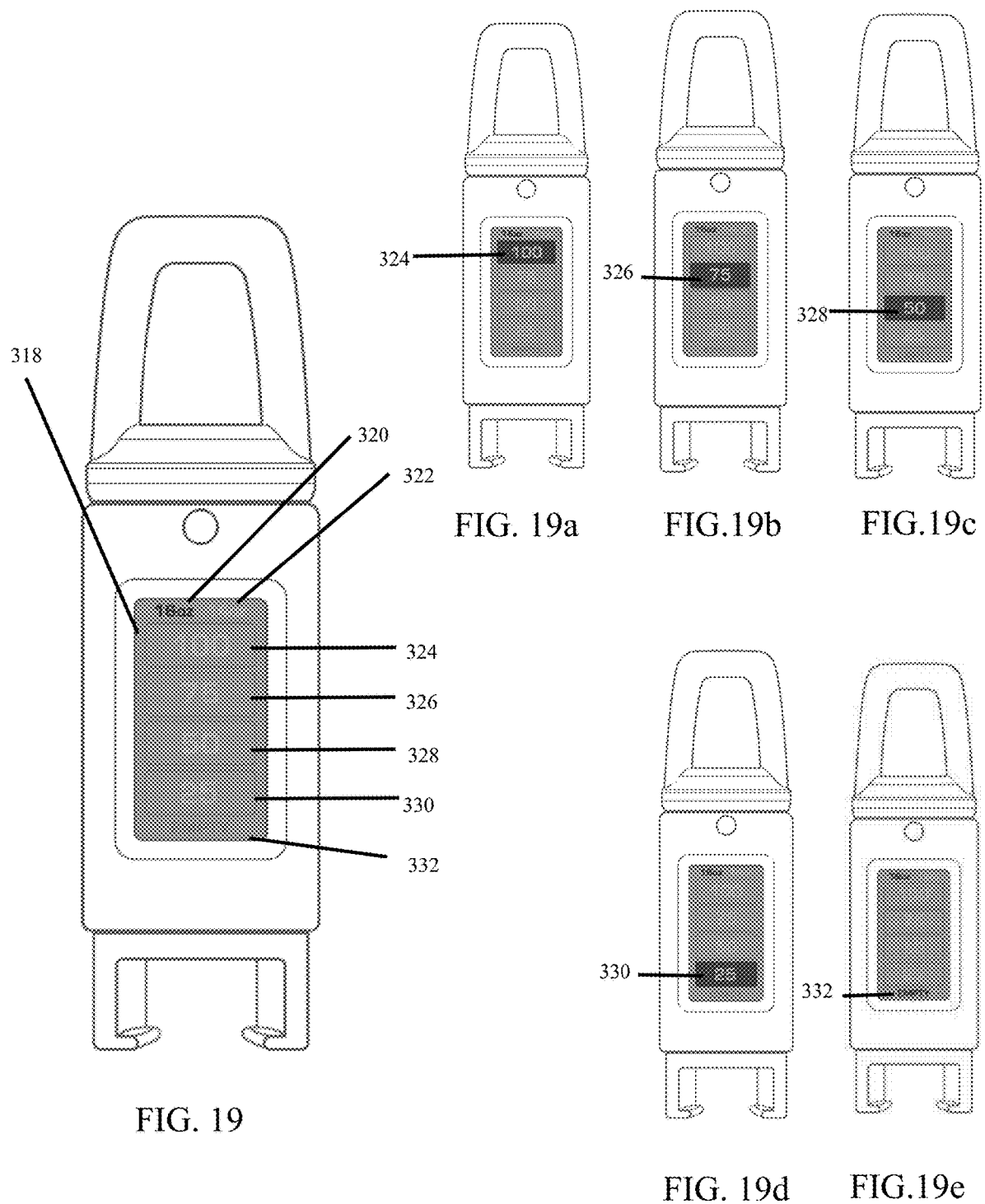
FIG. 19 is a front view of an exemplary gauge.
FIGS. 19a-19e show various states of display of the gauge shown in FIG. 19.

Referring now to FIGS. 19-19*e*, the display 318 includes a first tank size indicator 320 and a second tank size indicator 322, for example 16 oz and 14 oz. As shown, the first tank size indicator 320 is highlighted indicating that a sixteen ounce tank is to be measured. The display 318 also includes indicia 324-332 indicating the amount of fluid in the tank. For example, indicia 324 is the number 100 indicating the tank is full, indicia 326 is the number 75 indicating the tank is three quarters full, indicial 328 is the number 50 indicating the tank is half full, indicia 330 is the number 25 indicating the tank is one quarter full, and indicial 332 is the word empty indicating the tank is empty. It will be appreciated that the gauge can be designed to round up or down to the nearest indicia. FIG. 19a illustrates indicia 324 being highlighted to indicate the tank is full, FIG. 19b illustrates indicia 326 being highlighted to indicate the tank is three quarters full, FIG. 19c illustrates indicia 328 being highlighted to indicate the tank is half full, FIG. 19d illustrates indicia 330 being highlighted to indicate the tank is one quarter full, and FIG. 19e illustrates indicia 332 being highlighted to indicate the tank is empty.

Referring now to FIGS. 20-20e, the display 418 includes a first tank size indicator 420 and a second tank size indicator 422, for example a tank with the indicia 16 oz and a tank with indicia 14 oz. As shown, the first tank size indicator 420 is highlighted indicating that a sixteen ounce tank is to be measured. The display 418 also includes indicia 424-432 indicating the amount of fluid in the tank. For example, indicia 424-432 are horizontal bars of decreasing length from left to right. FIG. 20a illustrates all the horizontal bars 424-432 being highlighted to indicate to a user that the tank is full. FIG. 20b illustrates the horizontal bars 426-432 being highlighted to indicate to the user that the tank is mostly full, for example three quarters full. FIG. 20c illustrates the horizontal bars 428-432 being highlighted to indicate to the user that the tank is less full than in FIG. 20b, for example half full. FIG. 20d illustrates the horizontal bars 430 and 432 being highlighted to indicate to the user that the tank is less full than in FIG. 20c, for example one quarter full. FIG. 20e illustrates the horizontal bar 320 being highlighted along with indicia 434, for example the word empty, to indicate to the user that the tank is empty.

Figure 21:
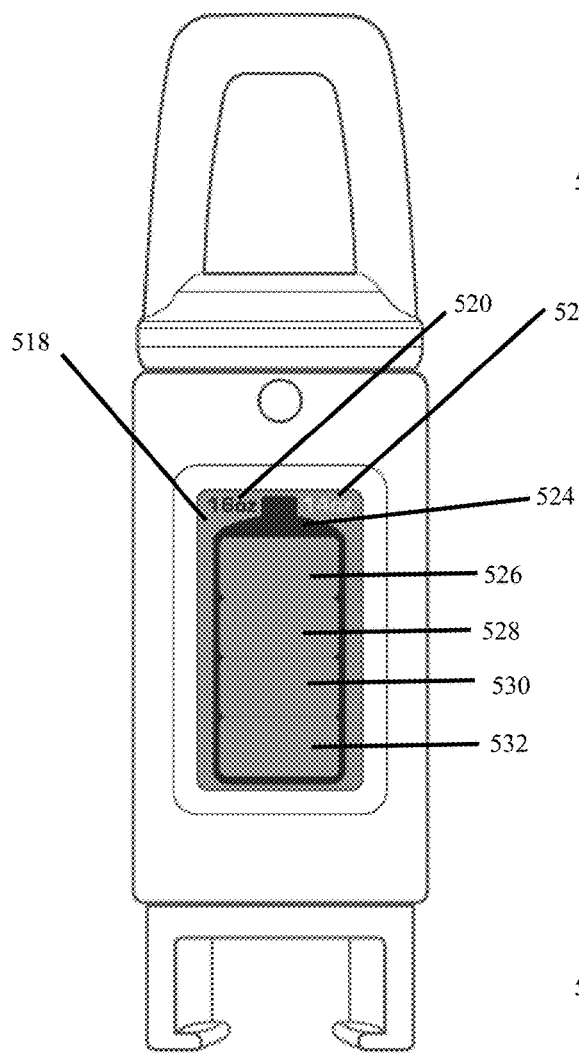
FIG. 21 is a front view of yet another exemplary gauge.
Figure 21A:
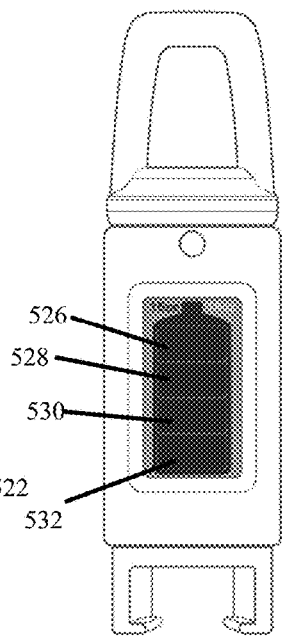
FIGS. 21a-21d show various states of display of the gauge shown in FIG. 21.
Figure 21B:
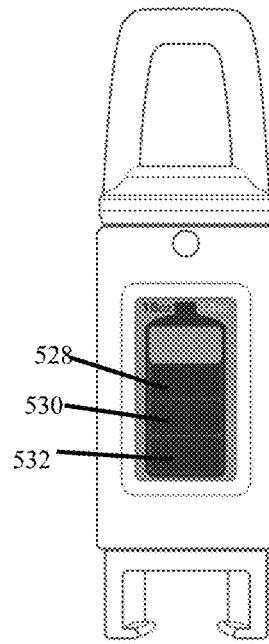
Figure 21C:
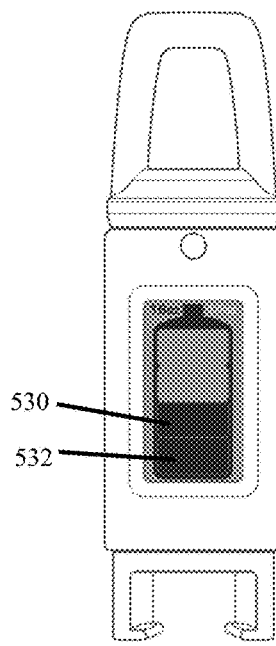
Figure 21D:
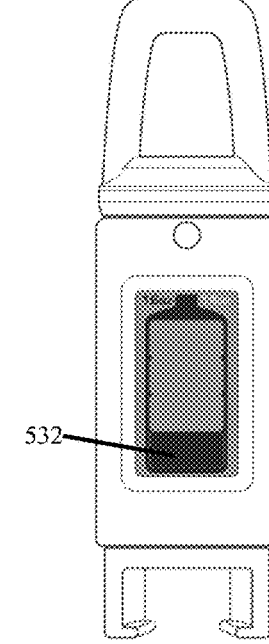

Referring now to FIGS. 21-21d the display 518 includes a first tank size indicator 520 and a second tank size indicator 522, for example 16 oz and 14 oz. As shown, the first tank size indicator 520 is highlighted indicating that a sixteen ounce tank is to be measured. The display also includes the outline of a tank 524 and indicia 526-532 indicating the amount of fluid in the tank. For example, indicia 526-532 are horizontal bars of substantially equal size. FIG. 21a illustrates all the horizontal bars 526-532 being highlighted to indicate to a user that the tank is full. FIG. 21b illustrates the horizontal bars 528-532 being highlighted to indicate to the user that the tank is mostly full, for example three quarters full. FIG. 21c illustrates the horizontal bars 530 and 532 being highlighted to indicate to the user that the tank is less full than in FIG. 21b, for example half full. FIG. 21d illustrates the horizontal bar 532 being highlighted to indicate to the user that the tank is less full than in FIG. 21c, for example one quarter full. If no bars are highlighted it will indicate to the user that the tank is empty.

Figures 22, 22A, 22B, 22C, 22D, 22E:
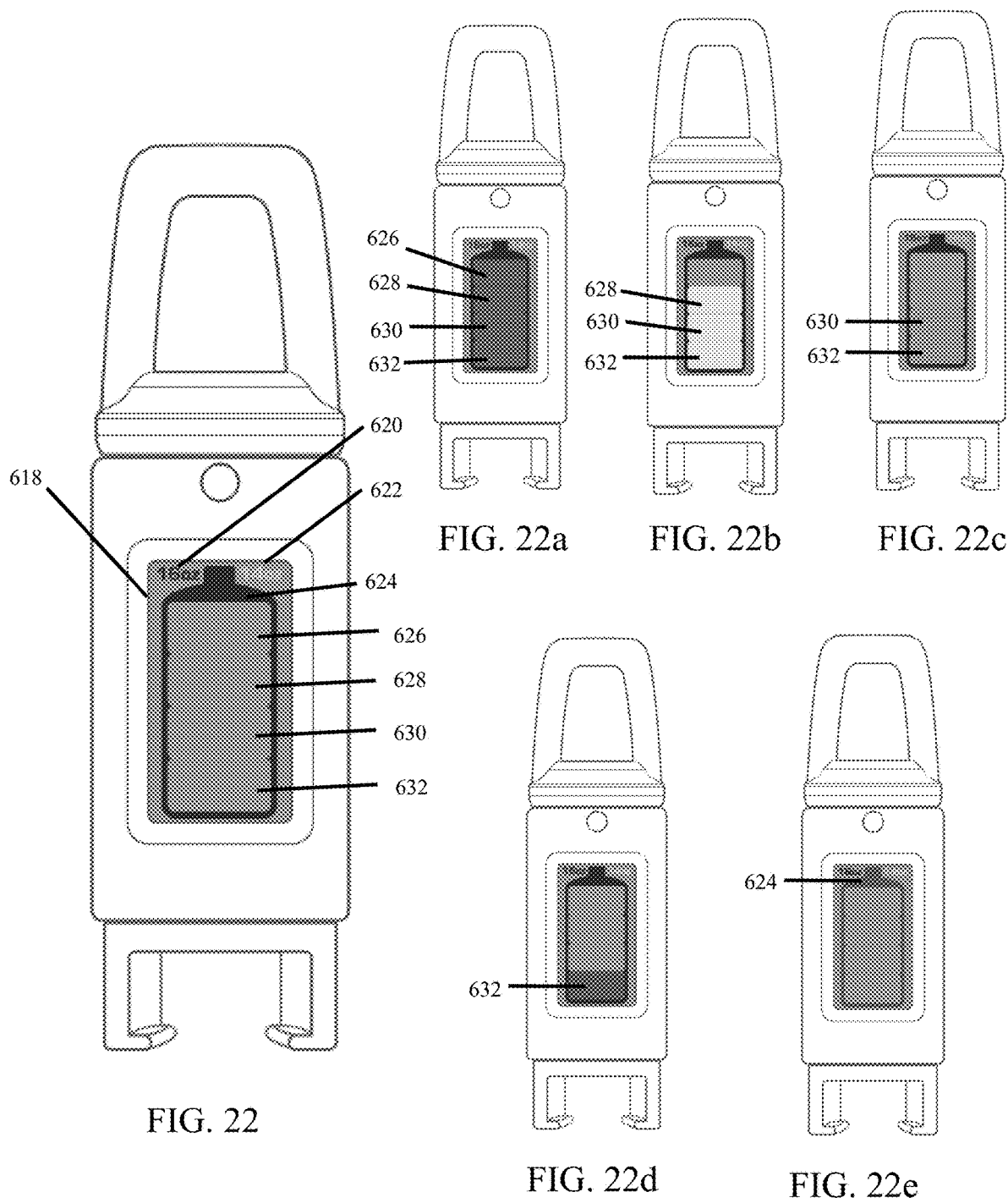
FIG. 22 is a front view of still another exemplary gauge.
FIGS. 22a-22e show various states of display of the gauge shown in FIG. 22.

Referring now to FIGS. 22-22e the display 618 includes a first tank size indicator 620 and a second tank size indicator 622, for example 16 oz and 14 oz. As shown, the first tank size indicator 620 is highlighted indicating that a sixteen ounce tank is to be measured. The display also includes the outline of a tank 624 and indicia 626-632 indicating the amount of fluid in the tank. For example, indicia 626-632 are horizontal bars of substantially equal size. FIG. 22a illustrates all the horizontal bars 626-632 being highlighted to indicate to a user that the tank is full. The bars can be highlighted in a suitable color, such as green. FIG. 22b illustrates the horizontal bars 628-632 being highlighted to indicate to the user that the tank is mostly full, for example three quarters full. The bars can be highlighted in a suitable color, such as yellow. FIG. 22c illustrates the horizontal bars 630 and 632 being highlighted to indicate to the user that the tank is less full than in FIG. 22b, for example half full. The bars can be highlighted in a suitable color, such as orange. FIG. 22d illustrates the horizontal bar 632 being highlighted to indicate to the user that the tank is less full than in FIG. 22c, for example one quarter full. The bar can be highlighted in a suitable color, such as red. FIG. 22e illustrates the tank 624 with no bars highlighted to indicate to the user that the tank is empty. The tank 624 can be highlighted in a suitable color to indicate empty, such as red.

Figure 23:
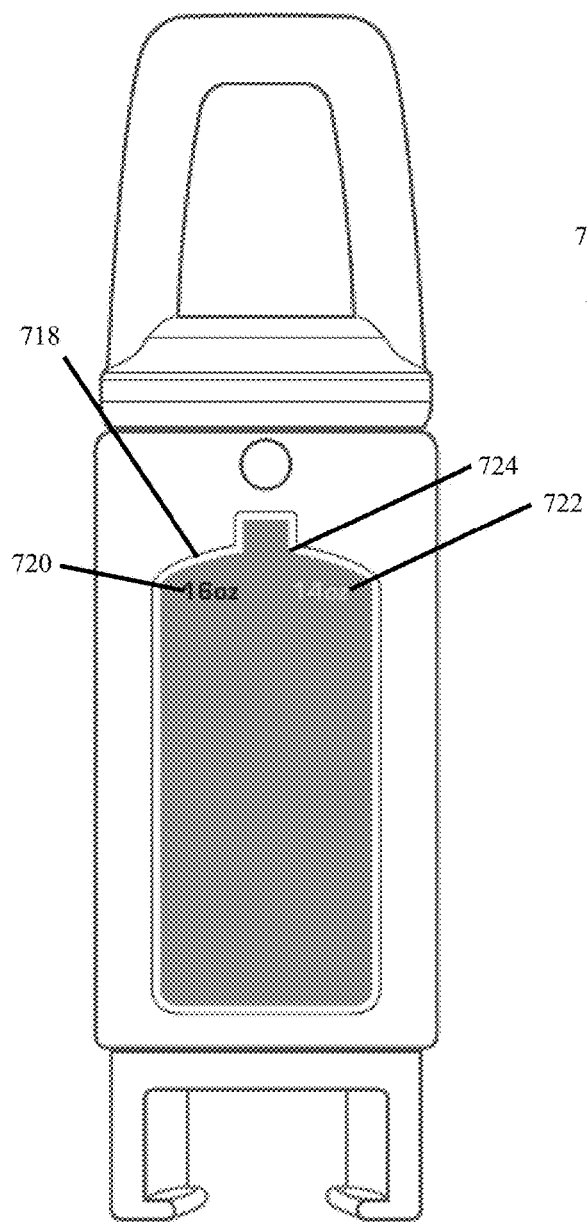
FIG. 23 is a front view of another exemplary gauge.
Figure 23A:
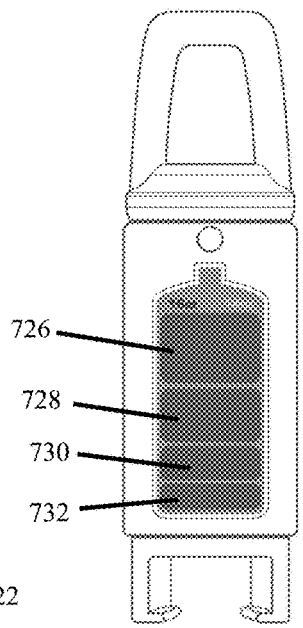
FIGS. 23a-23d show various states of display of the gauge shown in FIG. 23.
Figure 23B:
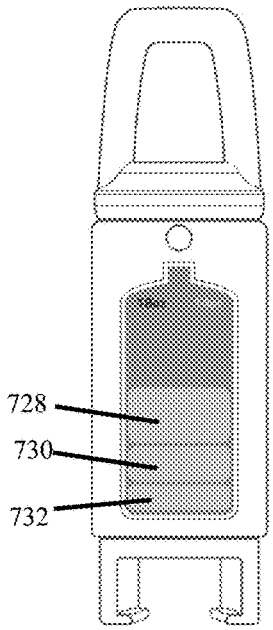
Figures 23C, 23D:
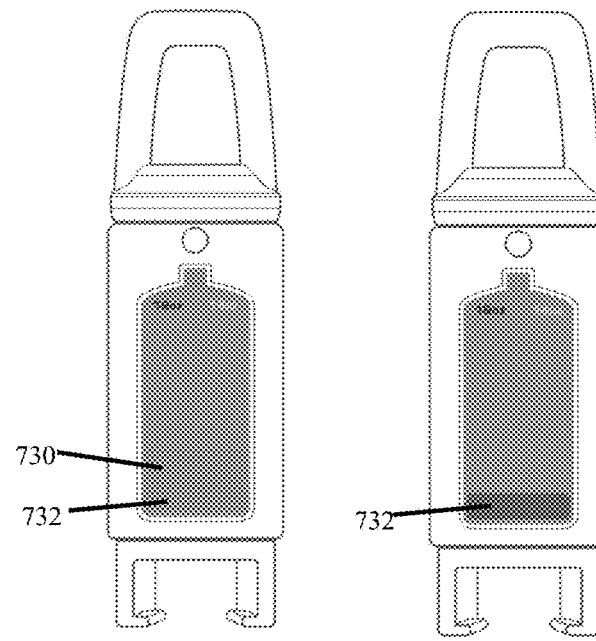

Referring now to FIGS. 23-23d the display 718 includes a first tank size indicator 720 and a second tank size indicator 722, for example 16 oz and 14 oz. As shown, the first tank size indicator 720 is highlighted indicating that a sixteen ounce tank is to be measured. The display also includes the outline of a tank 724 and indicia 726-732 indicating the amount of fluid in the tank. For example, indicia 726-732 are horizontal bars of decreasing width from top to bottom. FIG. 23a illustrates all the horizontal bars 726-732 being highlighted to indicate to a user that the tank is full. The bars can be highlighted in a suitable color, such as green. FIG. 23b illustrates the horizontal bars 728-732 being highlighted to indicate to the user that the tank is mostly full, for example two thirds full. The bars can be highlighted in a suitable color, such as yellow. FIG. 23c illustrates the horizontal bars 730 and 732 being highlighted to indicate to the user that the tank is less full than in FIG. 23b, for example one third full. The bars can be highlighted in a suitable color, such as orange. FIG. 23d illustrates the horizontal bar 732 being highlighted to indicate to the user that the tank is less full than in FIG. 23c, for example one sixth full. The bar can be highlighted in a suitable color, such as red.

Figures 24, 24A, 24B, 24C, 24D, 24E:
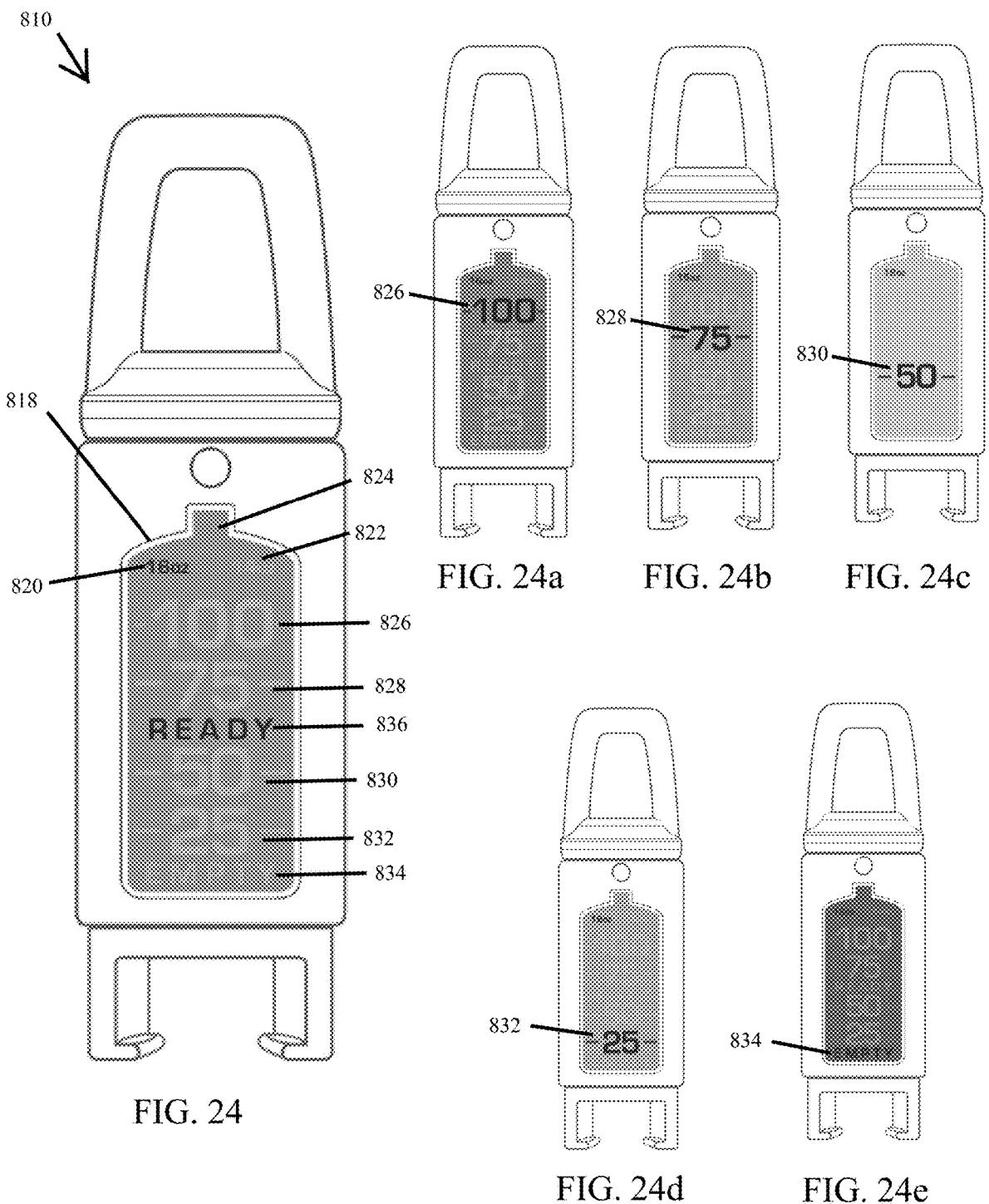
FIG. 24 is a front view of yet another exemplary gauge.
FIGS. 24a-24e show various states of display of the gauge shown in FIG. 24.

Referring now to FIGS. 24-24e the display 818 includes a first tank size indicator 820 and a second tank size indicator 822, for example 16 oz and 14 oz. As shown, the first tank size indicator 820 is highlighted indicating that a sixteen ounce tank is to be measured. The display 818 also includes the outline of a tank 824 and indicia 836 indicating that the gauge 810 is ready for use, and indicia 826-834 indicating the amount of fluid in the tank. For example, indicia 836 is the word ready, indicating that the gauge 810 is ready to measure the fluid level of the tank, the indicia 826 is the number 100 indicating the tank is full, indicia 828 is the number 75 indicating the tank is three quarters full, indicia 830 is the number 50 indicating the tank is half full, indicia 832 is the number 25 indicating the tank is one quarter full, and indicial 834 is the word empty indicating the tank is empty. It will be appreciated that the gauge 810 can be designed to round up or down to the nearest indicia. FIG. 24a illustrates indicia 826 and the tank 824 being highlighted to indicate the tank is full. The tank 824 can be highlighted in a suitable color, such as dark green. FIG. 24b illustrates indicia 828 and the tank 824 being highlighted to indicate the tank is three quarters full. The tank 824 can be highlighted in a suitable color, such as light green. FIG. 24c illustrates indicia 830 and the tank 824 being highlighted to indicate the tank is halfway full. The tank 824 can be highlighted in any suitable color, such as yellow. FIG. 24d illustrates indicia 832 and the tank 824 being highlighted to indicate the tank is one quarter full. The tank 824 can be highlighted in any suitable color, such as orange. FIG. 24e illustrates indicia 834 and the tank 824 being highlighted to indicate the tank is empty. The display 818 can be highlighted in any suitable color, such as red.

Figure 25:
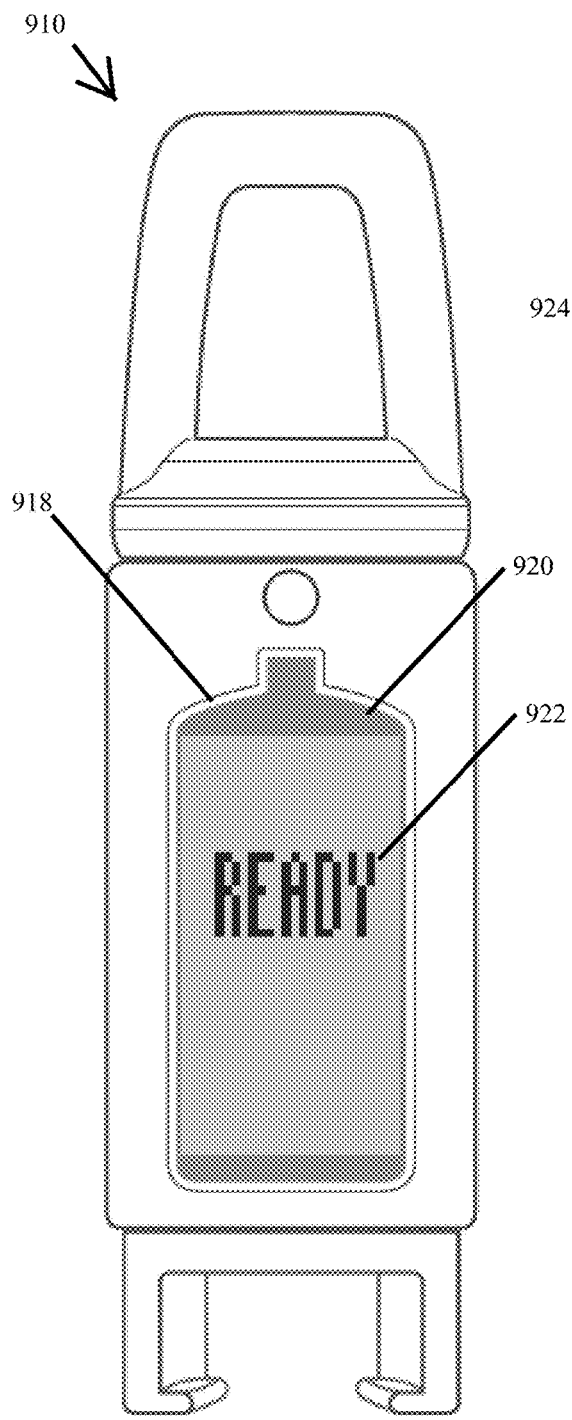
FIG. 25 is a front view of still another exemplary gauge.
Figure 25A:
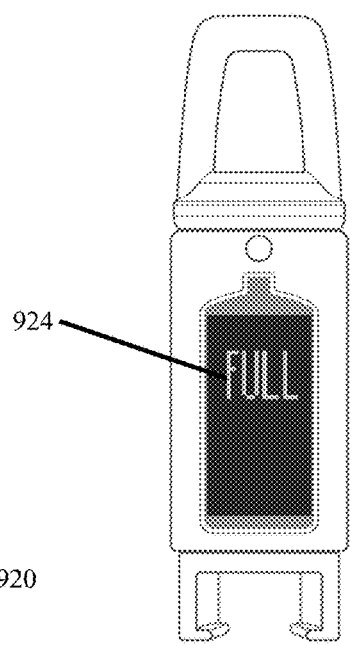
FIGS. 25a-25d show various states of display of the gauge shown in FIG. 25.
Figure 25B:
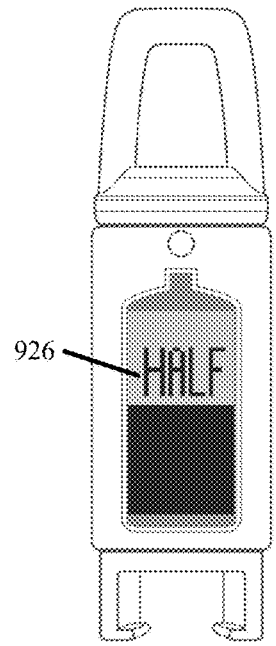
Figure 25C:
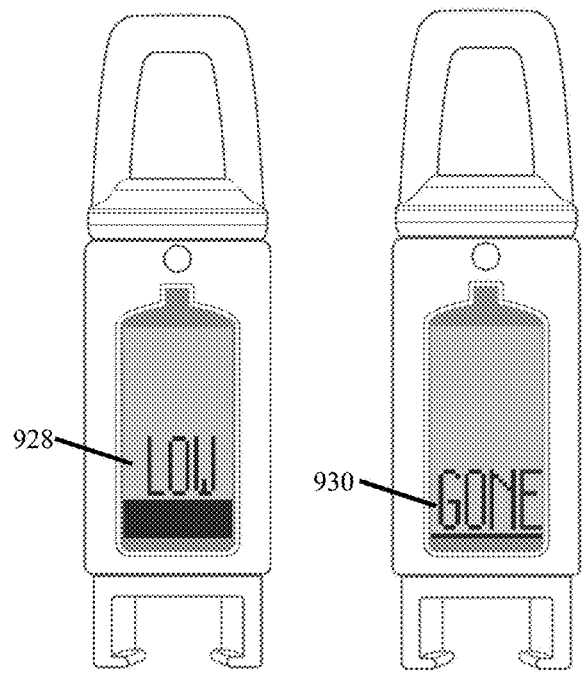
Figure 25D:
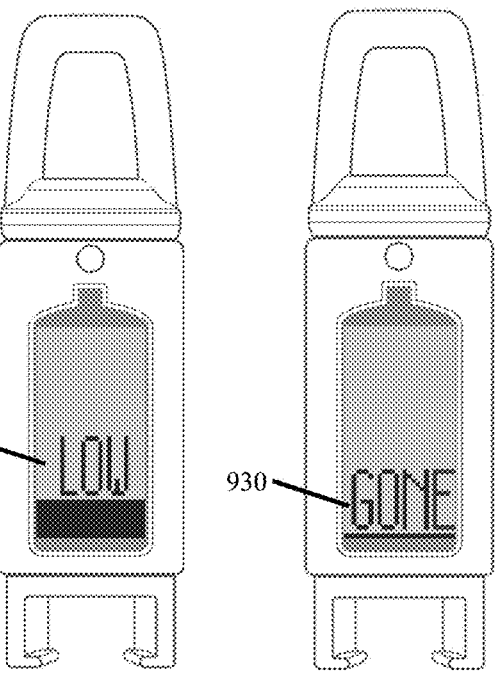
Figure 26:
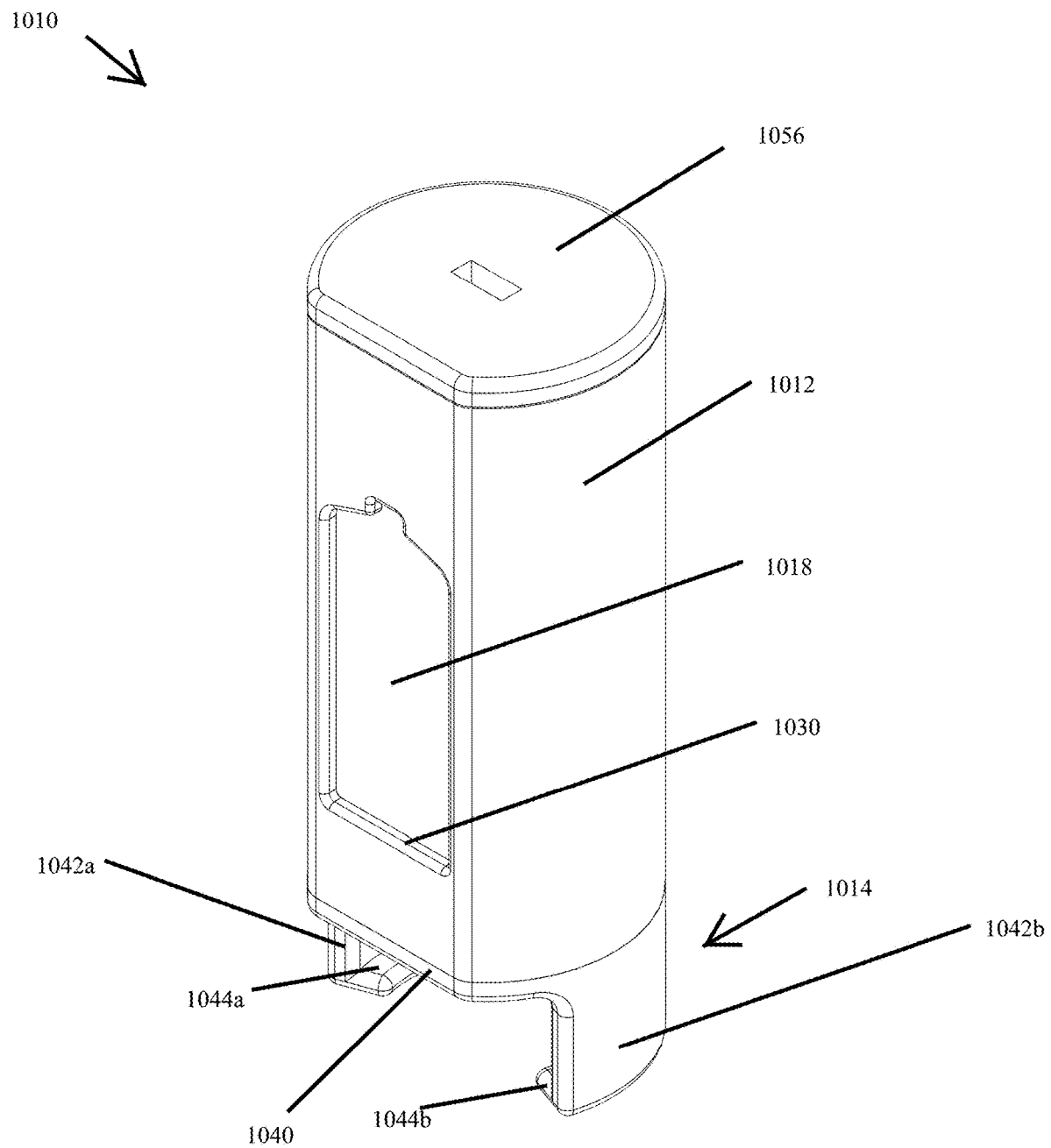
FIG. 26 is a perspective view of a further exemplary gauge.
Figure 27:
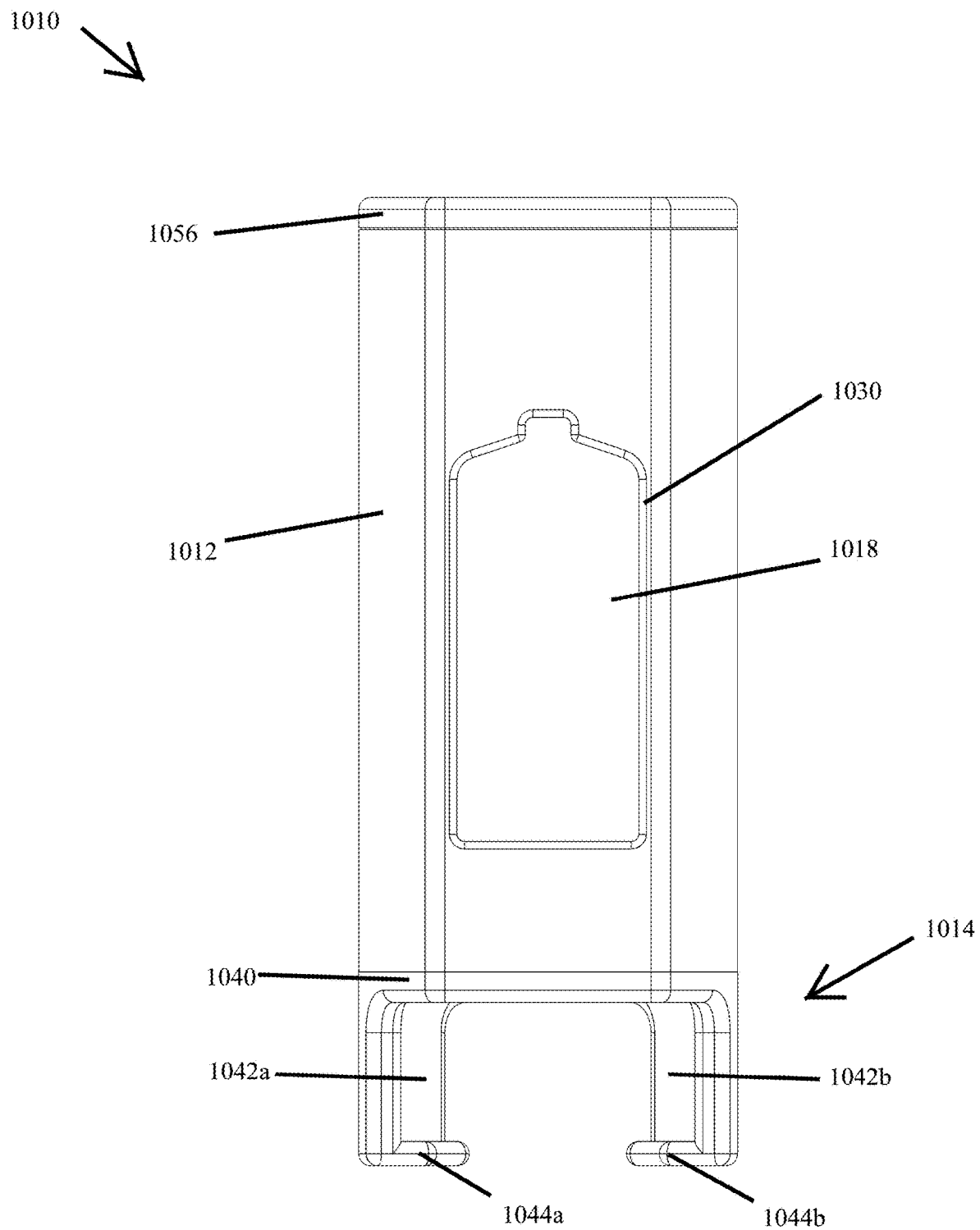
FIG. 27 is a front view of the gauge.
Figure 28:
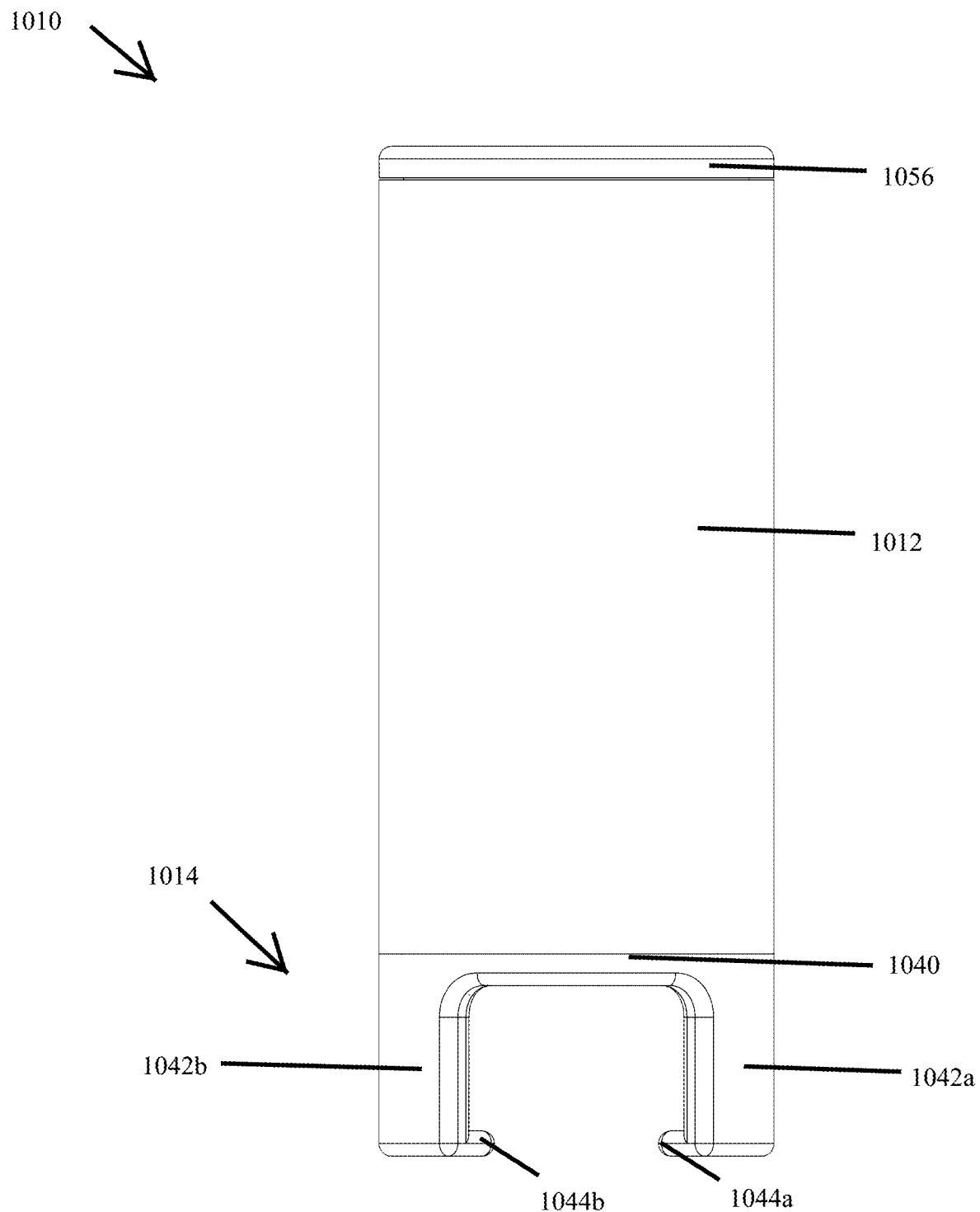
FIG. 28 is a back view of the gauge.
Figures 29, 30:
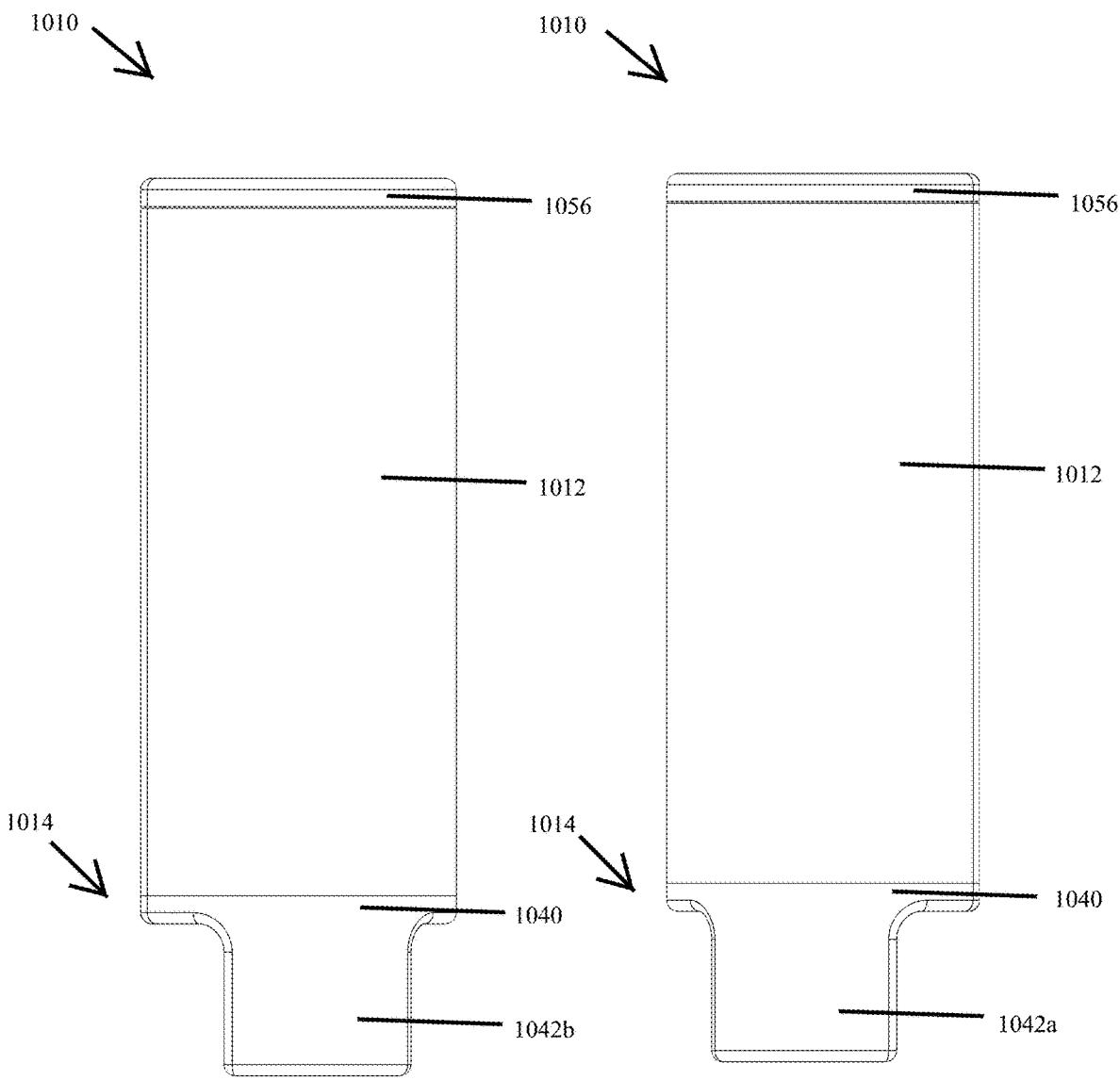
FIG. 29 is a left side view of the gauge.
FIG. 30 is a right side view of the gauge.
Figure 31:
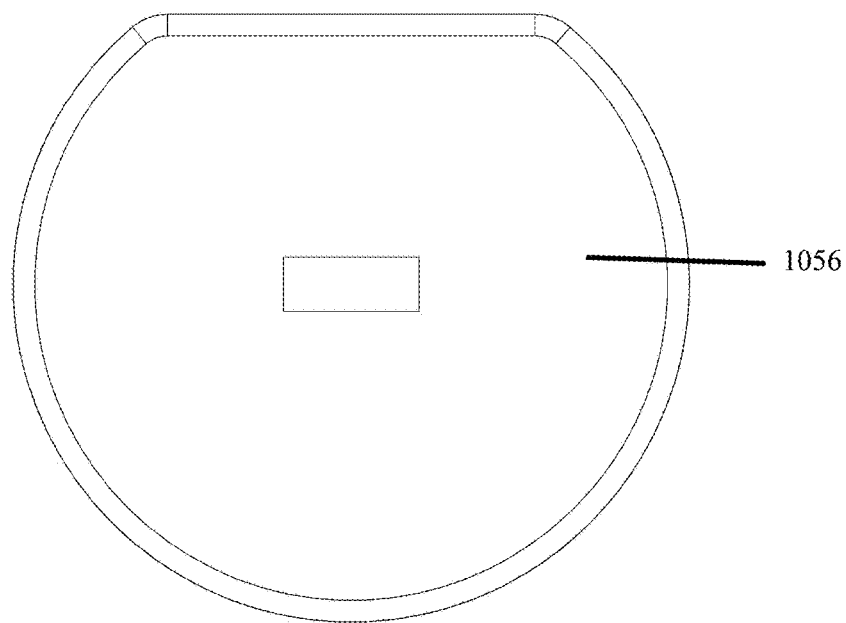
FIG. 31 is a top view of the gauge.

Referring now to FIGS. 25-25d the display 918 includes the outline of a tank 920 and indicia 922 indicating that the gauge 910 is ready for use, and indicia 924-930 indicating the amount of fluid in the tank. For example, indicia 922 is the word ready, indicating that the gauge 910 is ready to measure the fluid level of the tank, the indicia 924 is the word full indicating the tank is full, indicia 926 is the word half indicating the tank is half way full, indicia 928 is the word low indicating the tank is almost empty, indicia 930 is the word gone indicating the tank is empty. It will be appreciated that the gauge 910 can be designed to round up or down to the nearest indicia. FIG. 25a illustrates indicia 924 and the tank 920 being fully highlighted to indicate the tank is full. FIG. 25b illustrates indicia 926 and the tank 920 being half way highlighted to indicate the tank is half way full. FIG. 25c illustrates indicia 928 and the tank 920 being a quarter highlighted to indicate the tank is almost empty. FIG. 25d illustrates indicia 930 and the tank 920 being highlighted to indicate the tank is empty.

Turning now to FIGS. 9, and 26-34, an exemplary embodiment of the gauge is shown at 1010. The gauge 1010 is substantially the same as the above referenced gauge 10, and consequently the same reference numerals but indexed by 1000 are used to denote structures corresponding to similar structures in the gauge. In addition, the foregoing description of the gauge 10 is equally applicable to the gauge 1010 except as noted below.

The gauge 1010 includes a casing 1012, and an attachment member 1014 coupled to a bottom of the casing 1012. The casing 1012 and the attachment member 1014 may be made of any suitable material, such as plastic, metal, etc. The casing 1012 has an outer body 1062 defining a cavity 1022, an inner body 1064 surrounded by the outer body 1062, a cap 1056 attached to the inner body 1064, and a display member 1066 within the inner body 1064. A handle may attached to the top of the cap 1056. The handle may be made of any suitable material, such as plastic, metal, etc. The outer body 1062 has a display area 1018, shown as a tank shaped cutout. Housed within the casing 1012 is a spring 1046, which has a spring rate for measuring the fluid level in the tank. The spring is attached to a support 1060a on the body 1040 of the attachment member 1014 and a support 1060b on a bottom of the cap 1056.

When no tank is attached to the attachment member 1014, the inner body 1064 blocks the display member 1066. The display member 1066 and outer body 1062 can be attached to the attachment member 1014. When a tank is attached to the attachment member 1014, the weight causes the outer body 1062, display member 1066, and attachment member 1014 to move telescopically relative to the cap 1056 and inner body 1064. The more fluid in the tank, the further the display member 1066, outer body 1062, and attachment member 1014 will move, and the more of the attachment member 1014 will be visible through the display area 1018. In an embodiment, the display member 1066 may be colored, for example the color green, to provide a visual indication of fluid level in the tank.

The attachment member 1014 is shaped and sized to be removably attached to a valve 38 of the pressurized tank 36, such as to a CGA600 valve neck without a threaded connection to the valve neck. The attachment member 1014 is capable of attaching to and detaching from the valve 38 by applying a set amount of force. This force may allow the attachment member 1014 to disconnect from the valve 38, for example if the gauge 1010 and tank were dropped while connected to one another. The attachment member 1014 has a body 1040 and a pair of deflectable legs 1042a and 1042b extending downward from the body 1040 on opposing sides of the body 1040. In the illustrated embodiment, the legs are integrally formed with the body. Each leg 1042a and 1042b has a first end extending from the body 1040, and a second end with a respective foot 1044a, 1044b extending radially inwardly therefrom for holding the neck of the tank 36. An inner surface of each leg 1042a and 1042b wraps around and serves as a backstop to center the cylinder. The feet 1044a and 1044b of each leg 1042a and 1042b rest beneath the threading of the valve to hold and lift the cylinder and prevent the attachment member 1014 from being lifted off of the valve. In the illustrated embodiment, the body 1040 is shown as being substantially circular with a flat at the front, and the legs 42a and 42b are curved to correspond to the curve of the body 1040.

Figure 32:
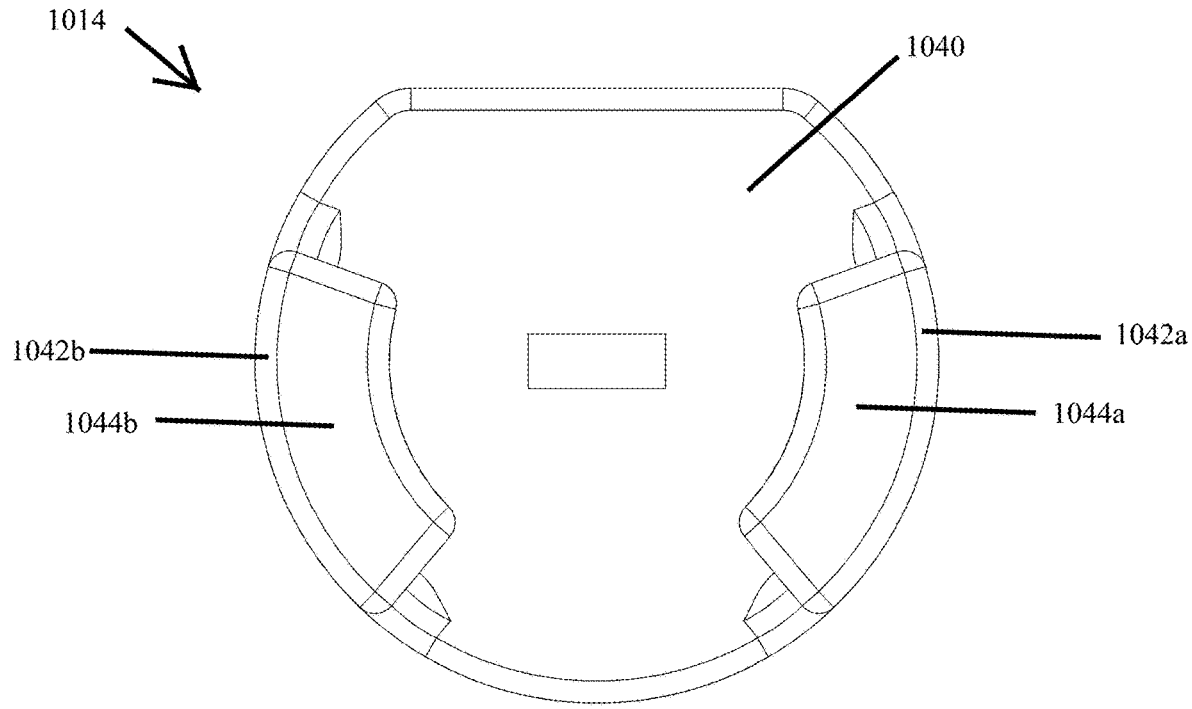
FIG. 32 is a bottom view of the gauge.
Figure 33:
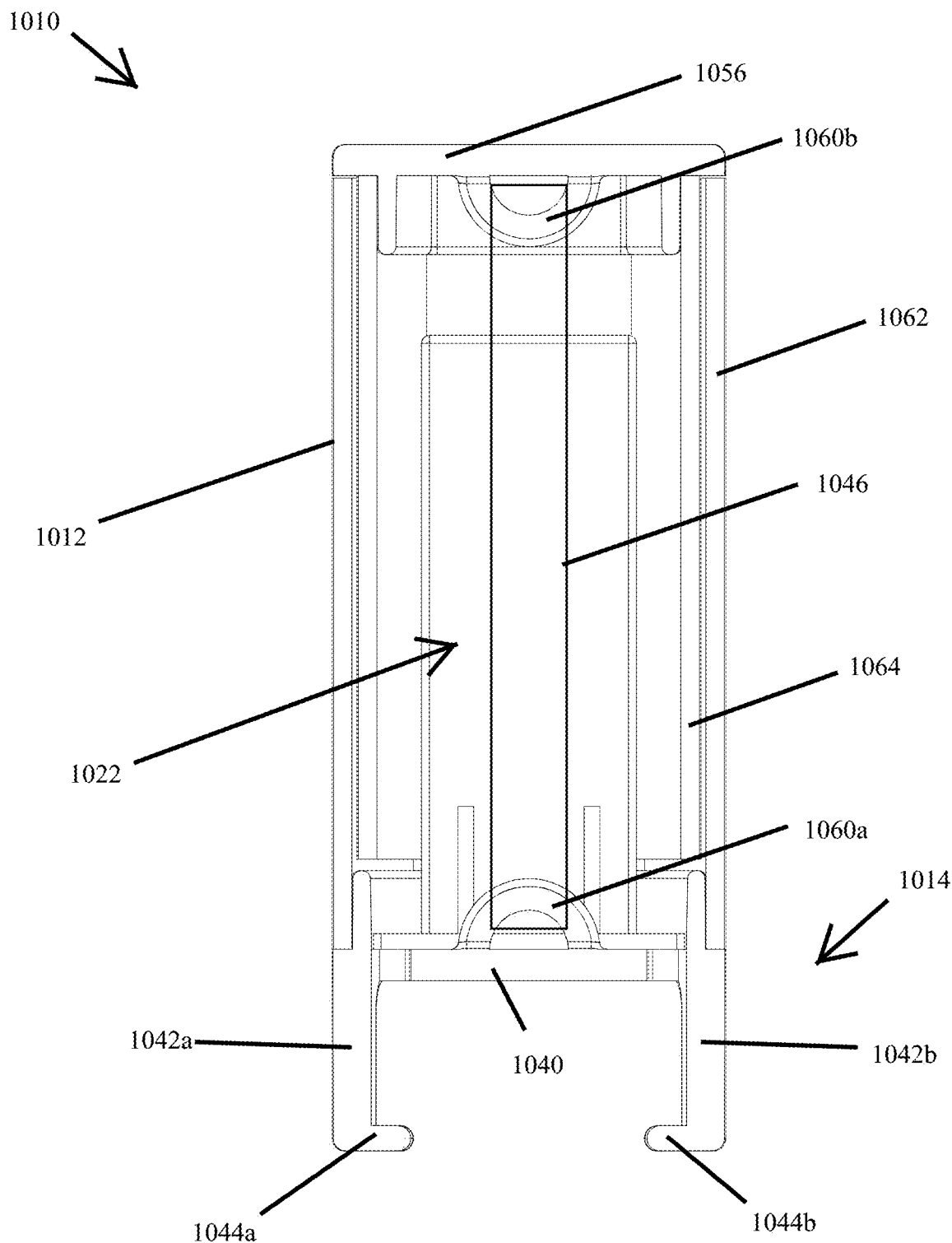
FIG. 33 is a cross-sectional view of the gauge.
Figure 34:
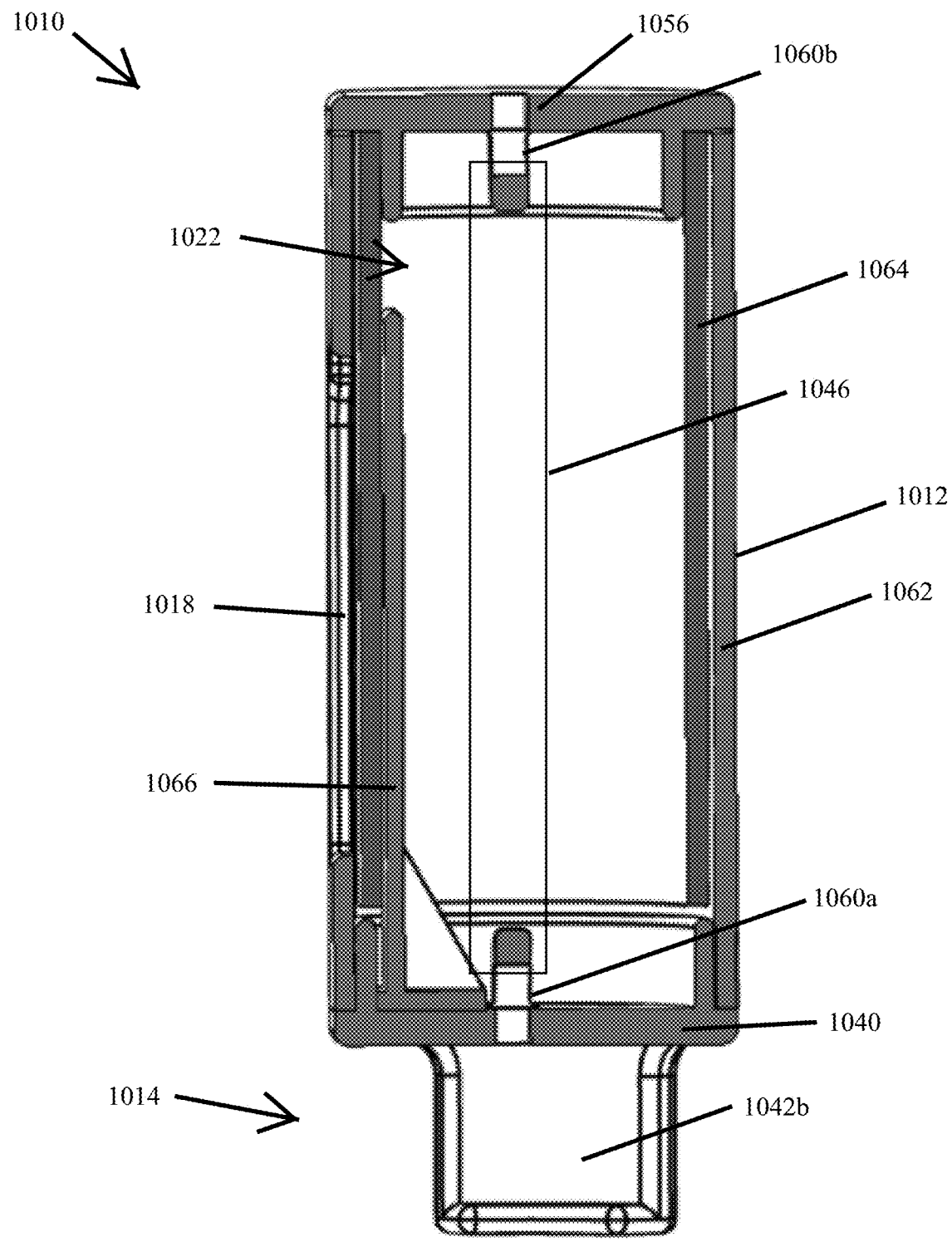
FIG. 34 is another cross-sectional view of the gauge.
Figure 35:
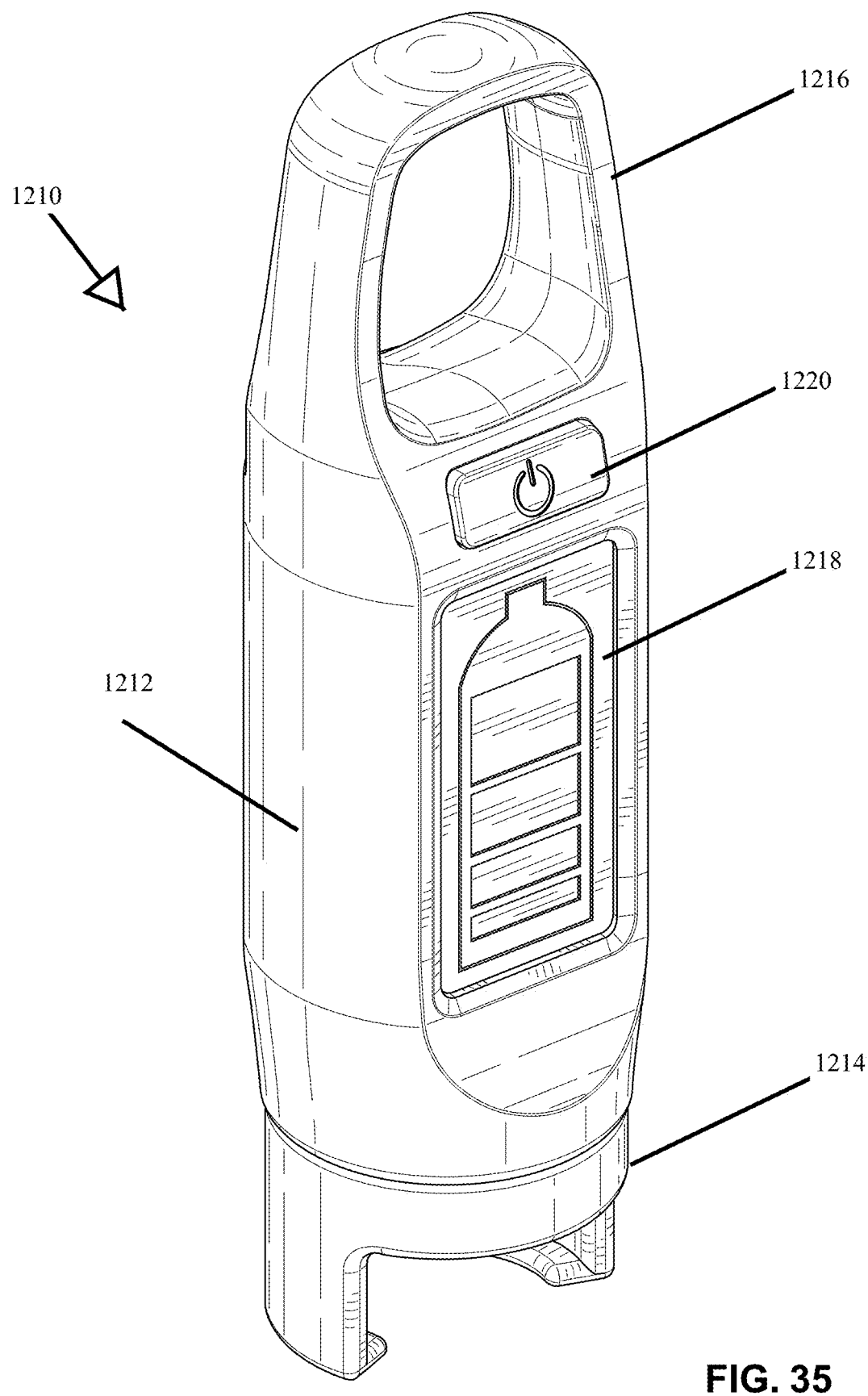
FIG. 35 is a top front perspective view of another exemplary gauge.
Figure 36:
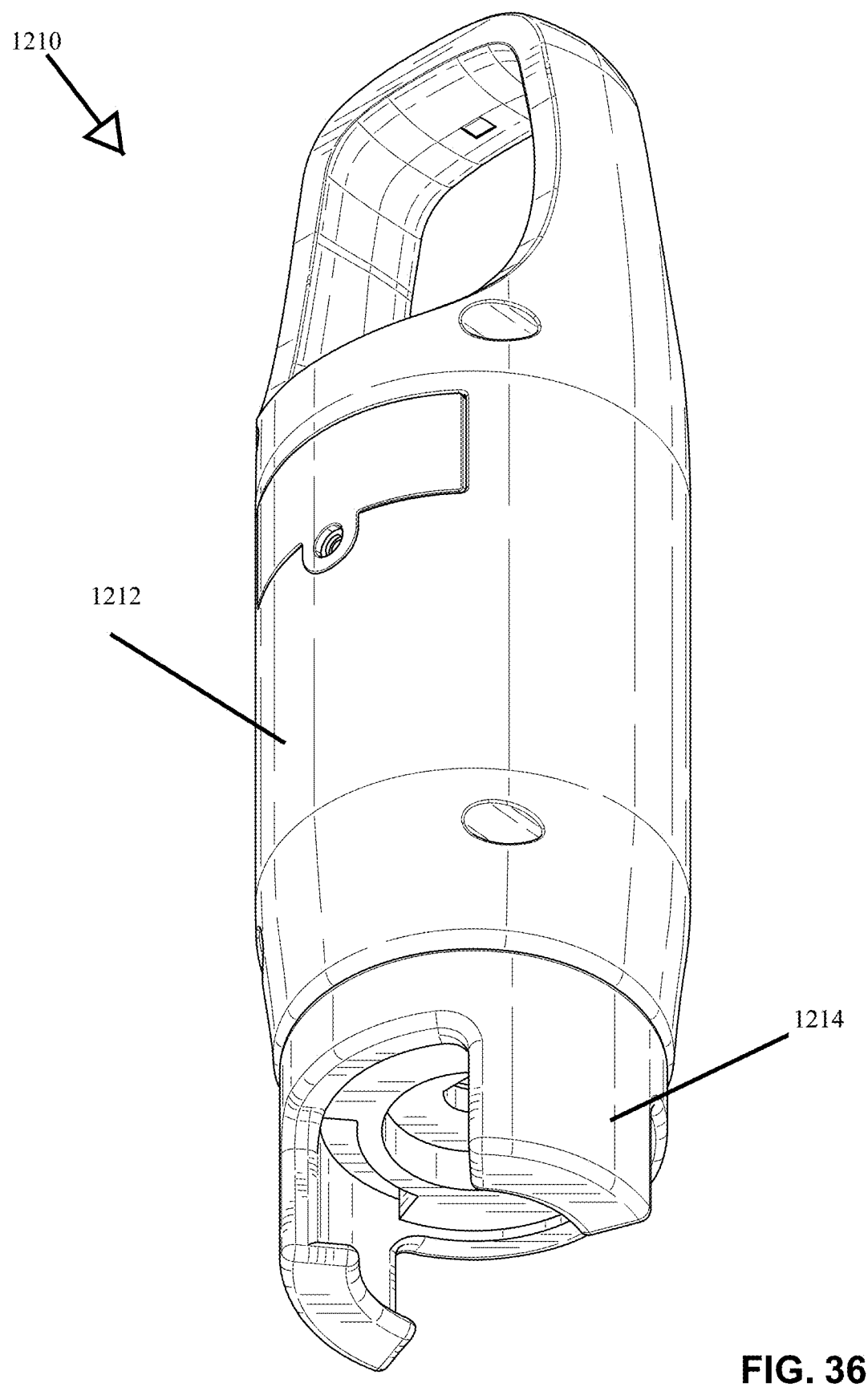
FIG. 36 is a bottom rear perspective view of the gauge.
Figure 37:
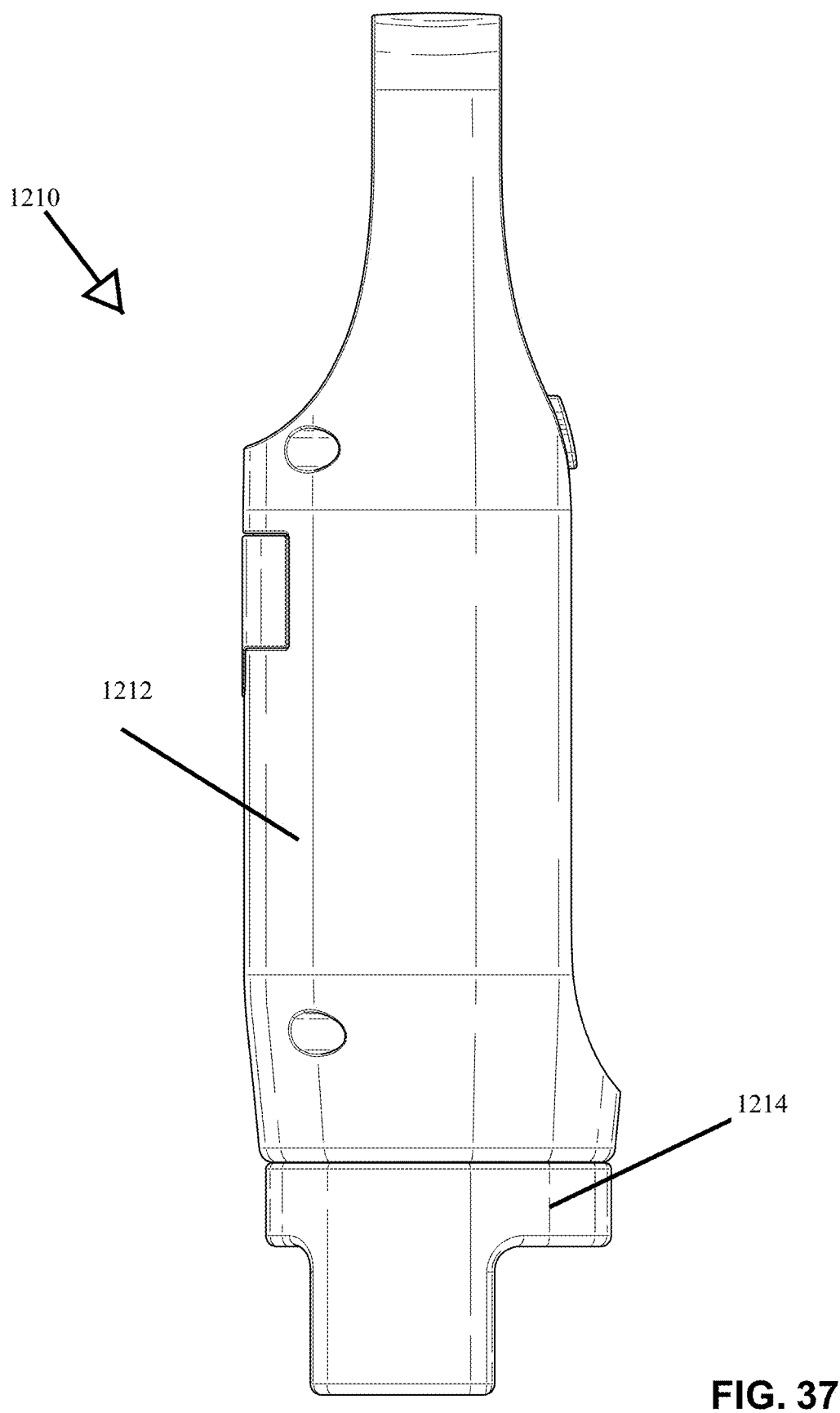
FIG. 37 is a left side view of the gauge.
Figure 38:
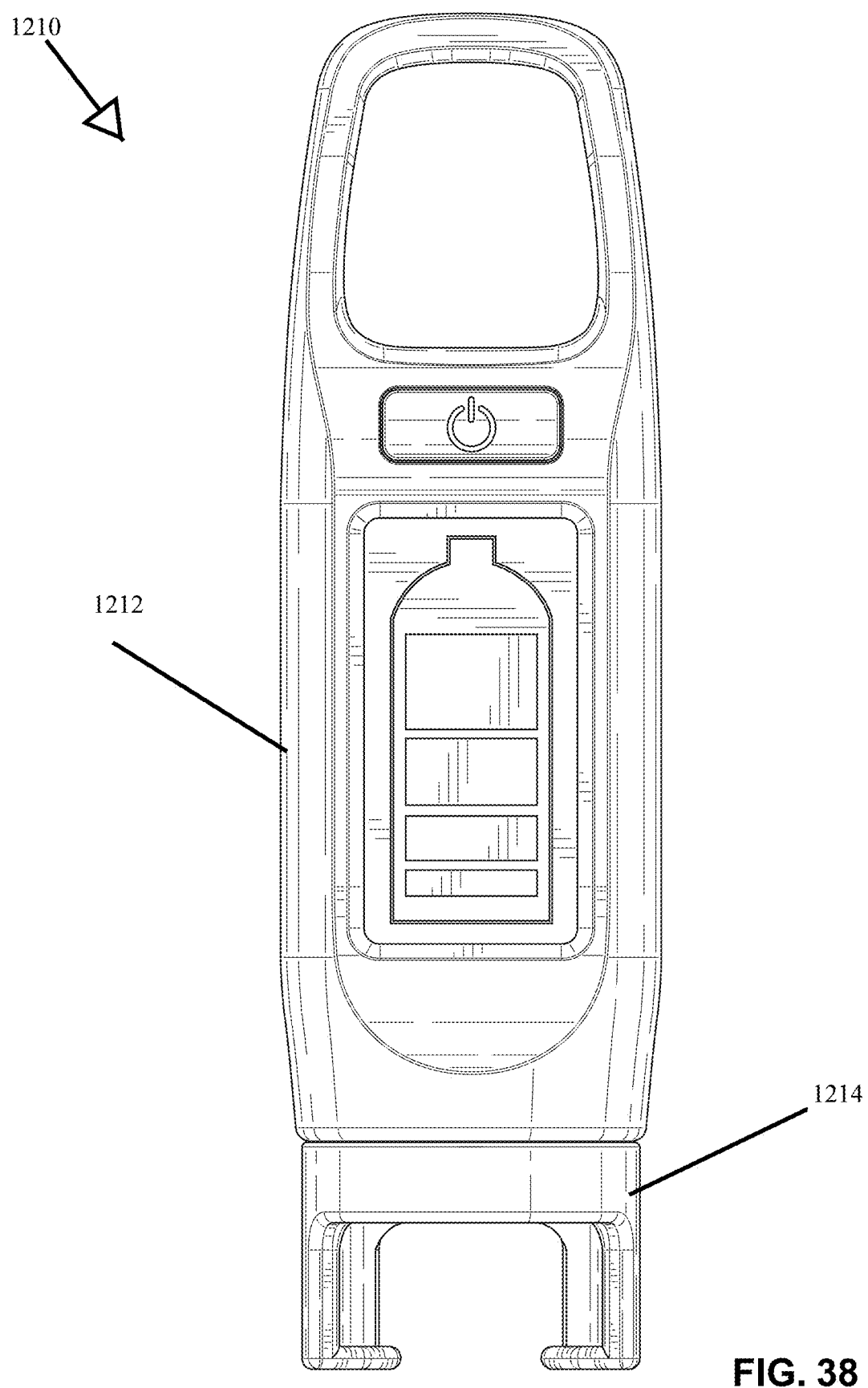
FIG. 38 is a front view of the gauge.
Figure 39:
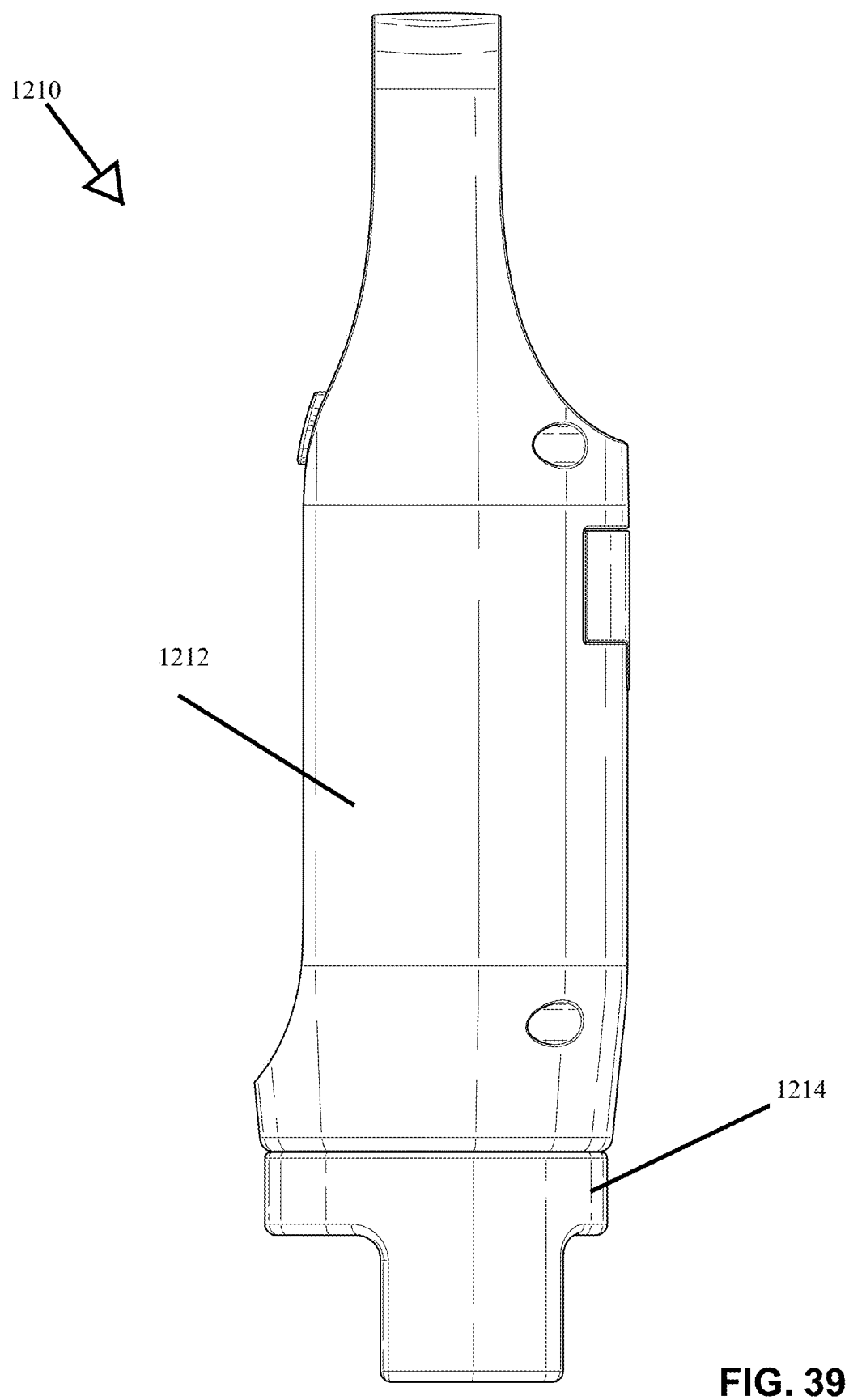
FIG. 39 is a right side view of the gauge.
Figure 40:
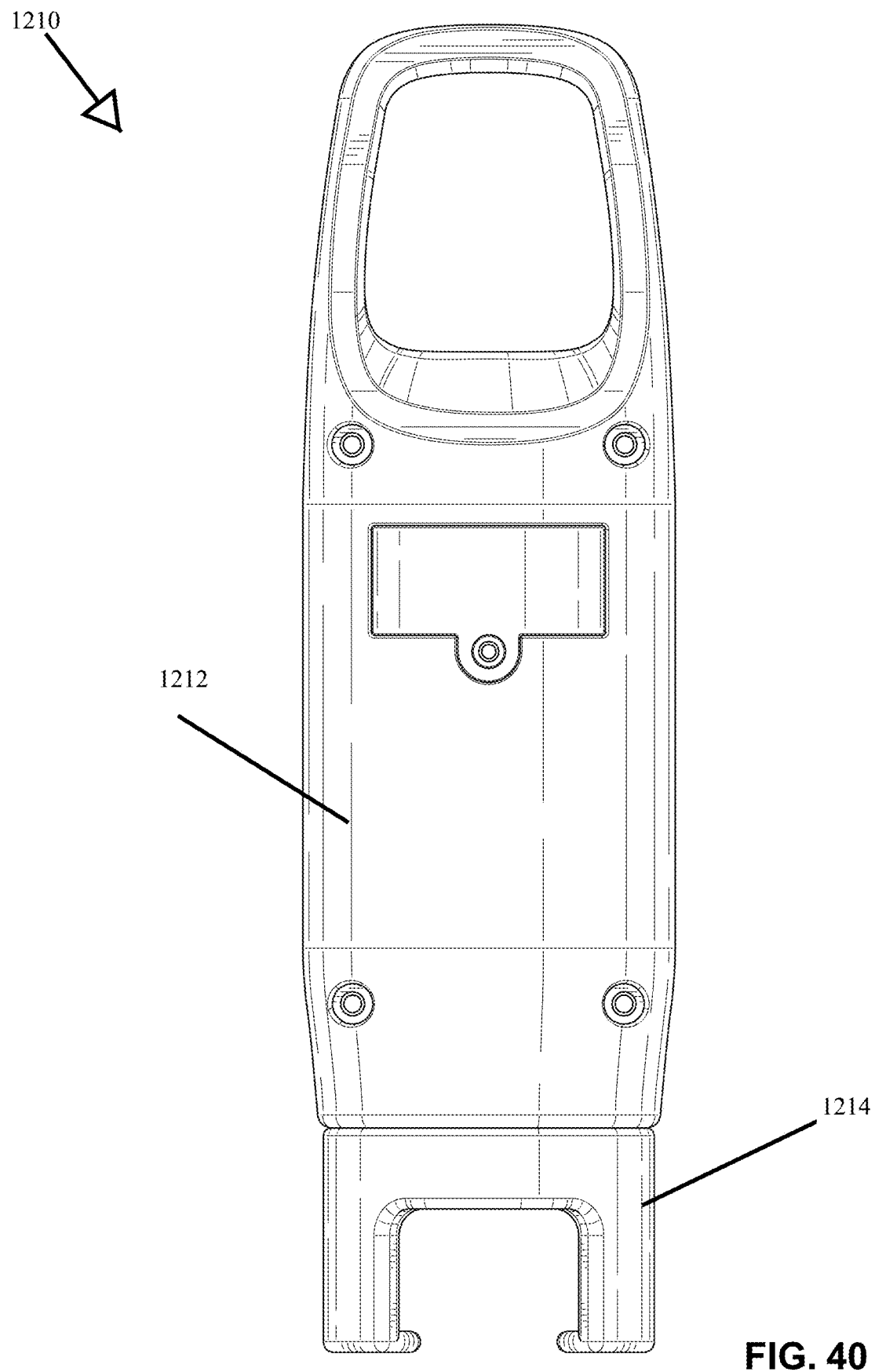
FIG. 40 is a rear view of the gauge.
Figure 41:
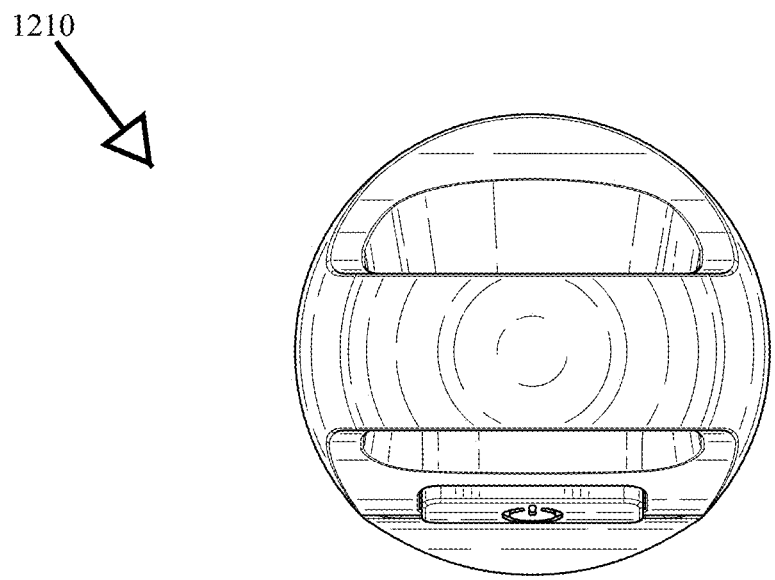
FIG. 41 is a top view of the gauge.
Figure 42:
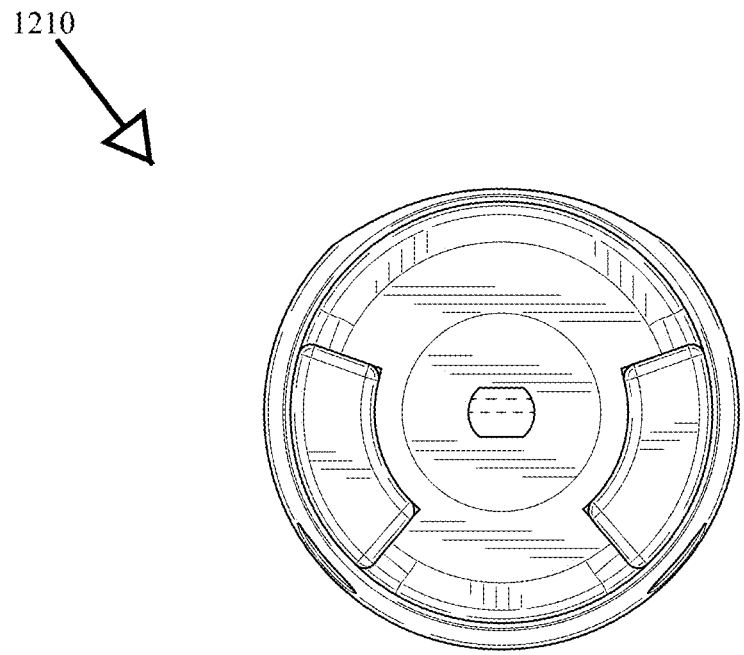
FIG. 42 is a bottom view of the gauge.

As best shown in FIG. 32, the fronts of the legs 1044a and 1044b are circumferentially spaced from one another a greater distance than the backs of the legs 1044a and 1044b to allow the neck to be inserted between the front of the legs and prevent the neck from passing through the space between the back of the legs. For example, the front of the legs are angled an angle X from a center of the body, for example twenty degrees from the center of the body 1040 allowing for the neck to be inserted between the legs, and the back of the legs are angled at a greater angle such that they are closer to one another to prevent the neck from passing through the space between the back of the legs. As the neck is being inserted between the legs 1044a and 1044b, the neck deflects the legs 1044a and 1044b outward and is held between the legs 1044a and 1044b by a snap fit. When attached, the fronts of the legs are in front of a center of the neck. The tank 36 can then be moved in the opposite direction to detach the neck from the attachment member 1014.

Turning now to FIGS. 35-42, an exemplary embodiment of the gauge is shown at 1210. The gauge 1210 is substantially the same as the above-referenced gauge 10, and consequently the same reference numerals but indexed by 1200 are used to denote structures corresponding to similar structures in the gauges. In addition, the foregoing description of the gauge 10 is equally applicable to the gauge 1210 except as noted below.

The gauge 10 includes a casing 1212, an attachment member 1214 coupled to a bottom of the casing 1212, and a handle 1216 coupled to a top of the casing 12. The casing 1212 has a front surface where a display 1218, such as a digital display, and a control element 1220, such as a power button, are located. The display 1218 can display a depiction of a tank as shown with indicators of the level of fluid in a tank, and receive an electrical signal to indicate the level of fluid within the tank.

The aforementioned systems, components, (valves, pressurized tanks, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A gauge configured to be connected to a pressurized tank, the gauge comprising:
   a casing defining an internal cavity;
   a measuring device disposed in the internal cavity;
   a power source disposed in the internal cavity;
   a display at a front surface of the casing powered by the power source; and
   an attachment member coupled to the measuring device and casing, the attachment member including a body and first and second legs projecting downward from the body, each of the first and second legs having a radially inwardly extending foot for supporting a neck of the pressurized tank, wherein fronts of the legs are circumferentially spaced from one another a greater distance than backs of the legs.

2. The gauge according to claim 1, wherein the measurement is a weight of the pressurized tank.

3. The gauge according to claim 1, wherein the display is configured to display indicia indicating a level of fluid in the tank based on the measurement.

4. The gauge according to claim 1, wherein the gauge further includes a control element for activating the display and toggling between a first pressurized tank size and a second pressurized tank size.

5. The gauge according to claim 1, wherein the gauge further includes a handle coupled to the casing.

6. The gauge according to claim 1, wherein the attachment member is configured to support the neck of the pressurized tank without a threaded connection to the neck.

7. The gauge according to claim 1, wherein the legs are configured to deflect to receive and hold the neck by a snap fit.

8. The gauge according to claim 1, wherein the body has a center, and wherein the front of each leg is angled from the center of the body substantially twenty degrees.

9. The gauge according to claim 1, wherein the body is substantially circular and wherein the first and second deflectable legs are curved to correspond to a curve of the body.

10. The gauge according to claim 1 in combination with the pressurized tank, wherein the neck of the pressurized tank further comprises a valve having threads.

11. The combination according to claim 10, wherein the threads extend downward from a first point on the neck to a second point on the neck, and the first and second legs extend downward from the body a distance greater than or equal to a distance from a top of the neck to the second point.

12. An attachment member for a pressurized tank comprising:
   a body; and
   first and second deflectable legs extending downward from the body on opposed sides thereof, each of the first and second legs having a radially inwardly extending foot at a free end thereof forming a ledge below threads of a neck of a pressurized tank,
   wherein fronts of the legs are circumferentially spaced from one another a greater distance than backs of the legs to allow the neck to be inserted between the fronts of the legs and prevent the neck from passing through a space between the backs of the legs.

13. The attachment member according to claim 12, wherein the body is substantially circular and wherein the first and second deflectable legs are curved to correspond to a curve of the body.

14. The attachment member according to claim 12, wherein the first and second legs are configured to deflect to receive and hold the neck by a snap fit.

15. The attachment member according to claim 12, wherein the attachment member is configured to support the neck of the pressurized tank without a threaded connection to the neck.

16. The attachment member according to claim 12, wherein the body has a center, and wherein the front of each leg is angled from the center of the body substantially twenty degrees.

17. The attachment member according to claim 12, wherein the neck further comprises a threaded connection, the threaded connection extends downward from a first point on the neck to a second point on the neck, and the first and second legs extend downward from the body a distance greater than or equal to a distance from a top of the neck to the second point.

18. A gauge configured to be connected to a pressurized tank, the gauge comprising:
   a casing defining an internal cavity;
   a measuring device disposed in the internal cavity;
   a display coupled to the casing and configured to display indicia indicating a level of fluid in the pressurized tank;
   a control element for activating the display and toggling between a first pressurized tank size and a second pressurized tank size; and
   an attachment member coupled to the measuring device and the casing, the attachment member including a body and first and second legs projecting downward from the body, each of the first and second legs having a radially inwardly extending foot for supporting a neck of the pressurized tank free of a threaded connection to the neck.

19. The gauge according to claim 18, wherein fronts of the legs are circumferentially spaced from one another a greater distance than backs of the legs.

20. The gauge according to claim 19, wherein the legs are configured to deflect to receive and hold the neck by a snap fit.

* * * * *